United States Patent
Kim et al.

(10) Patent No.: US 12,489,862 B2
(45) Date of Patent: Dec. 2, 2025

(54) DISPLAY DEVICE

(71) Applicant: LG ELECTRONICS INC., Seoul (KR)

(72) Inventors: Doyoung Kim, Seoul (KR); Kyoungjoon Lee, Seoul (KR); Byungkil Lim, Seoul (KR); Sejin Kwon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/843,480

(22) PCT Filed: Mar. 4, 2022

(86) PCT No.: PCT/KR2022/003060
§ 371 (c)(1),
(2) Date: Sep. 3, 2024

(87) PCT Pub. No.: WO2023/167348
PCT Pub. Date: Sep. 7, 2023

(65) Prior Publication Data
US 2025/0175574 A1 May 29, 2025

(51) Int. Cl.
*H04N 5/655* (2006.01)
*G02F 1/1333* (2006.01)
*G06F 1/16* (2006.01)

(52) U.S. Cl.
CPC ........... *H04N 5/655* (2013.01); *G06F 1/1652* (2013.01); *C09J 2301/304* (2020.08); *G02F 1/133308* (2013.01)

(58) Field of Classification Search
CPC .. H04N 5/655; G06F 1/1652; C09J 2301/304; G02F 1/133308
See application file for complete search history.

(56) References Cited

U.S. PATENT DOCUMENTS

2020/0201382 A1   6/2020   Lee et al.

FOREIGN PATENT DOCUMENTS

| EP | 4 456 682 A1 | 10/2024 |
|---|---|---|
| KR | 10-2008-0111847 A | 12/2008 |
| KR | 10-2012-0067506 A | 6/2012 |
| KR | 10-2014-0113017 A | 9/2014 |

(Continued)

OTHER PUBLICATIONS

Extended European Search Report for European Application No. 22929992.0, dated Mar. 18, 2025.

*Primary Examiner* — Justin W Rider
(74) *Attorney, Agent, or Firm* — Birch, Stewart, Kolasch & Birch, LLP

(57) ABSTRACT

A display device is disclosed. The display device may include: a display panel; a material complexed panel positioned behind the display panel, to which the display panel is coupled, and including fibers; and a side frame extending along a periphery of the material complexed panel, the side frame including: a horizontal part positioned between the display panel and the material complexed panel; and a vertical part intersecting the horizontal part and covering a side surface of the material complexed panel, wherein the material complexed panel may include an outer part adjacent to the periphery of the material complexed panel and formed by being recessed rearward from a front surface of the material complexed panel, and the horizontal part may face the outer part and may be coupled to the outer part.

15 Claims, 26 Drawing Sheets

(56) References Cited

FOREIGN PATENT DOCUMENTS

| | | |
|---|---|---|
| KR | 10-2018-0011446 A | 2/2018 |
| KR | 10-2021-0088343 A | 7/2021 |
| KR | 10-2021-0108239 A | 9/2021 |

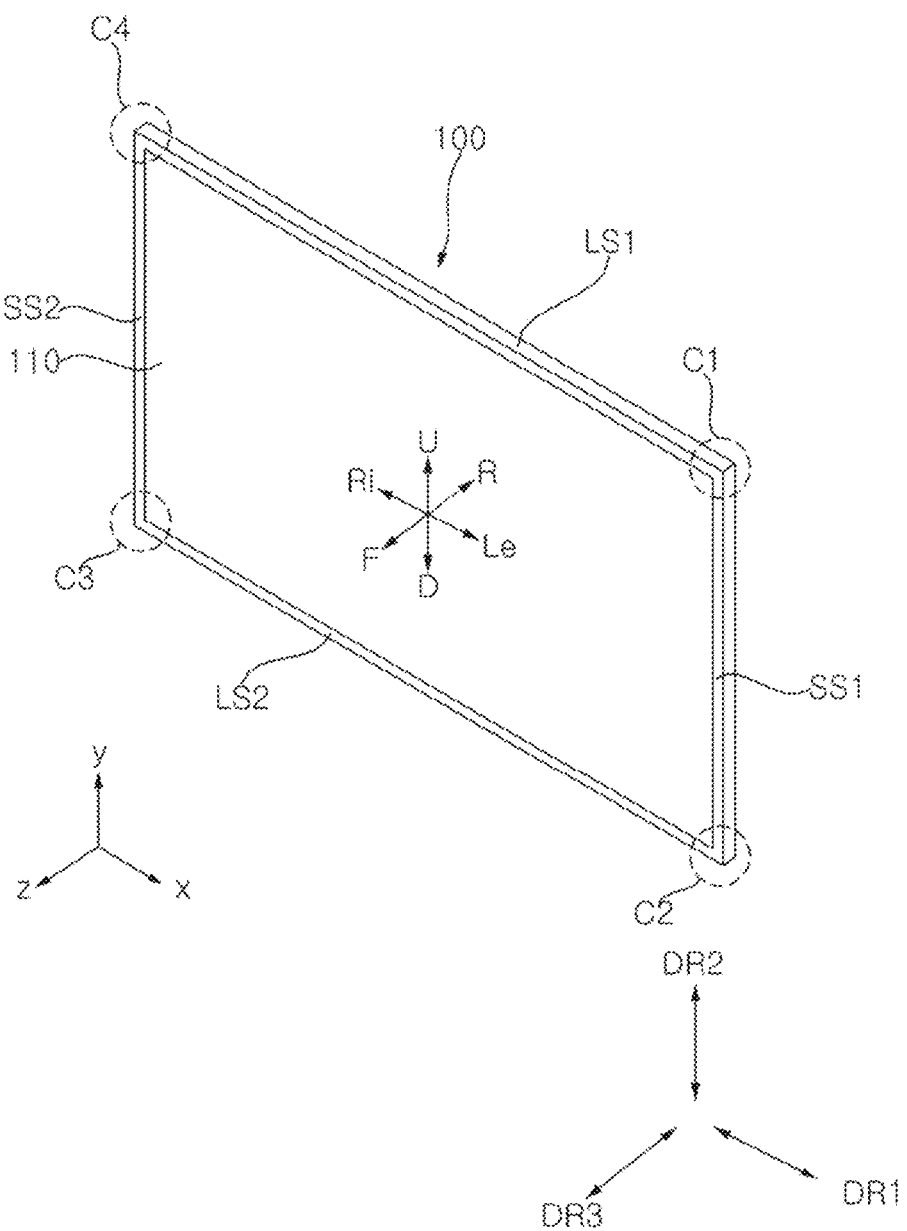
[FIG. 1]

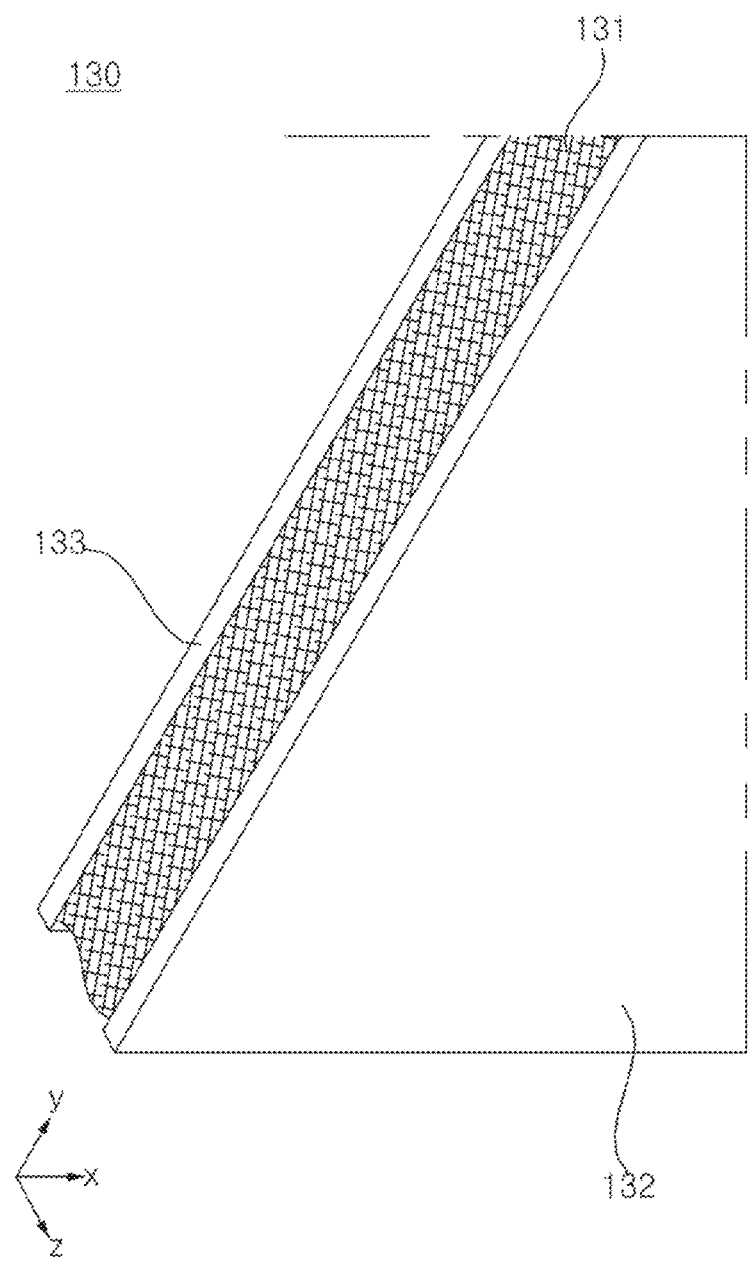
[FIG. 2]

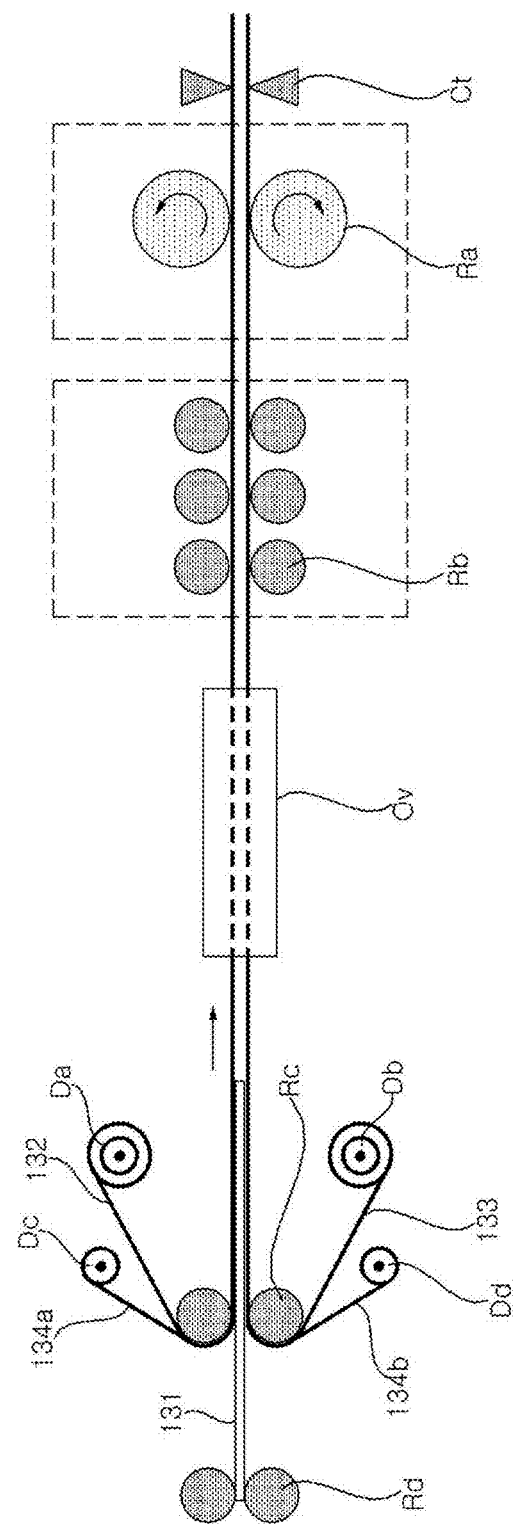
[FIG. 3]

[FIG. 4]
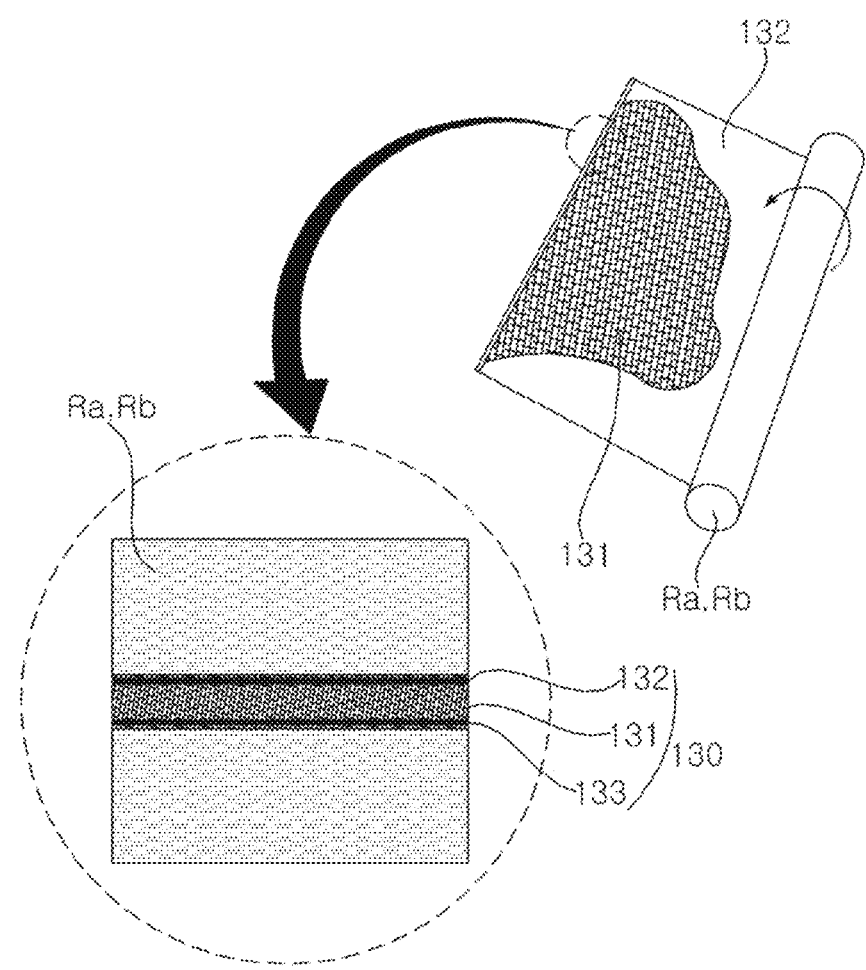

[FIG. 5]
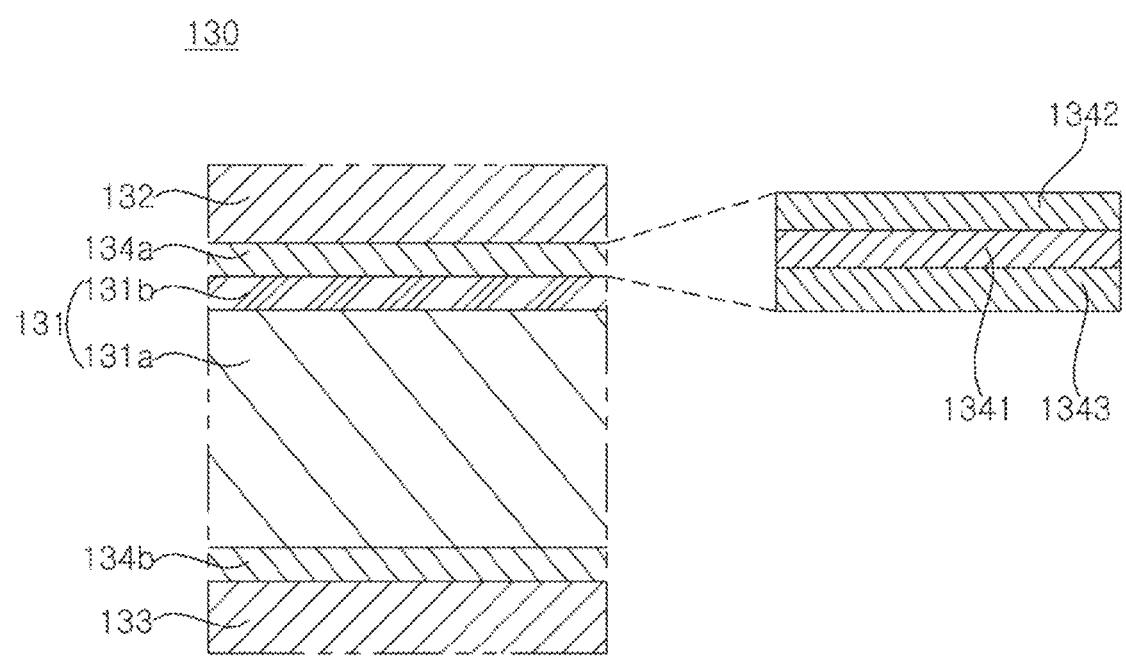

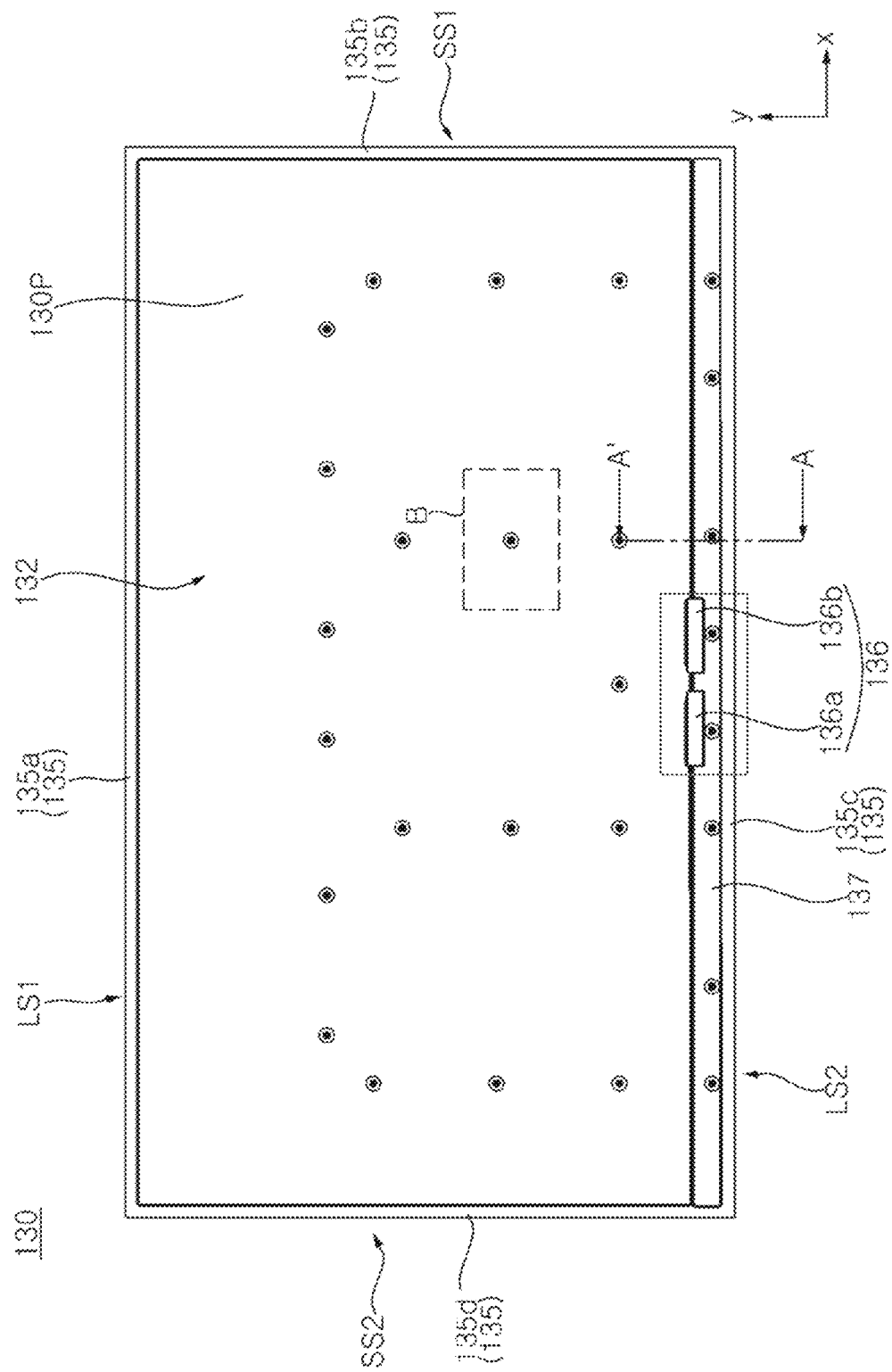
[FIG. 6]

[FIG. 7]
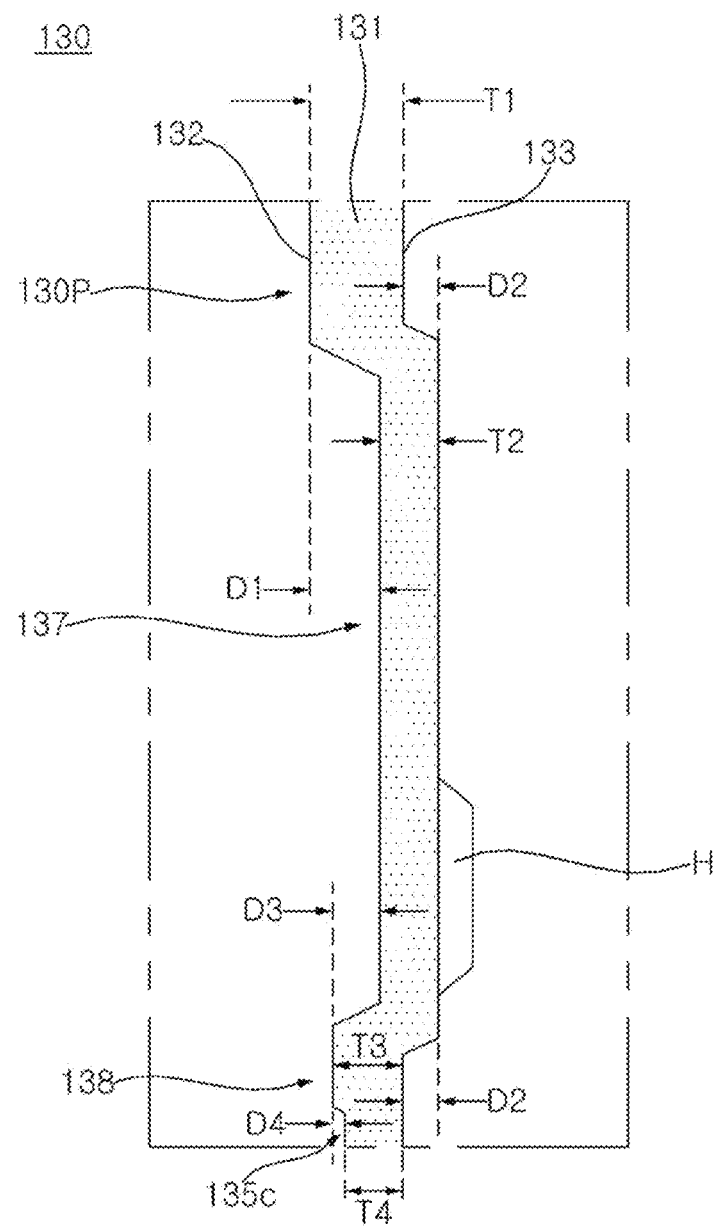

[FIG. 8]
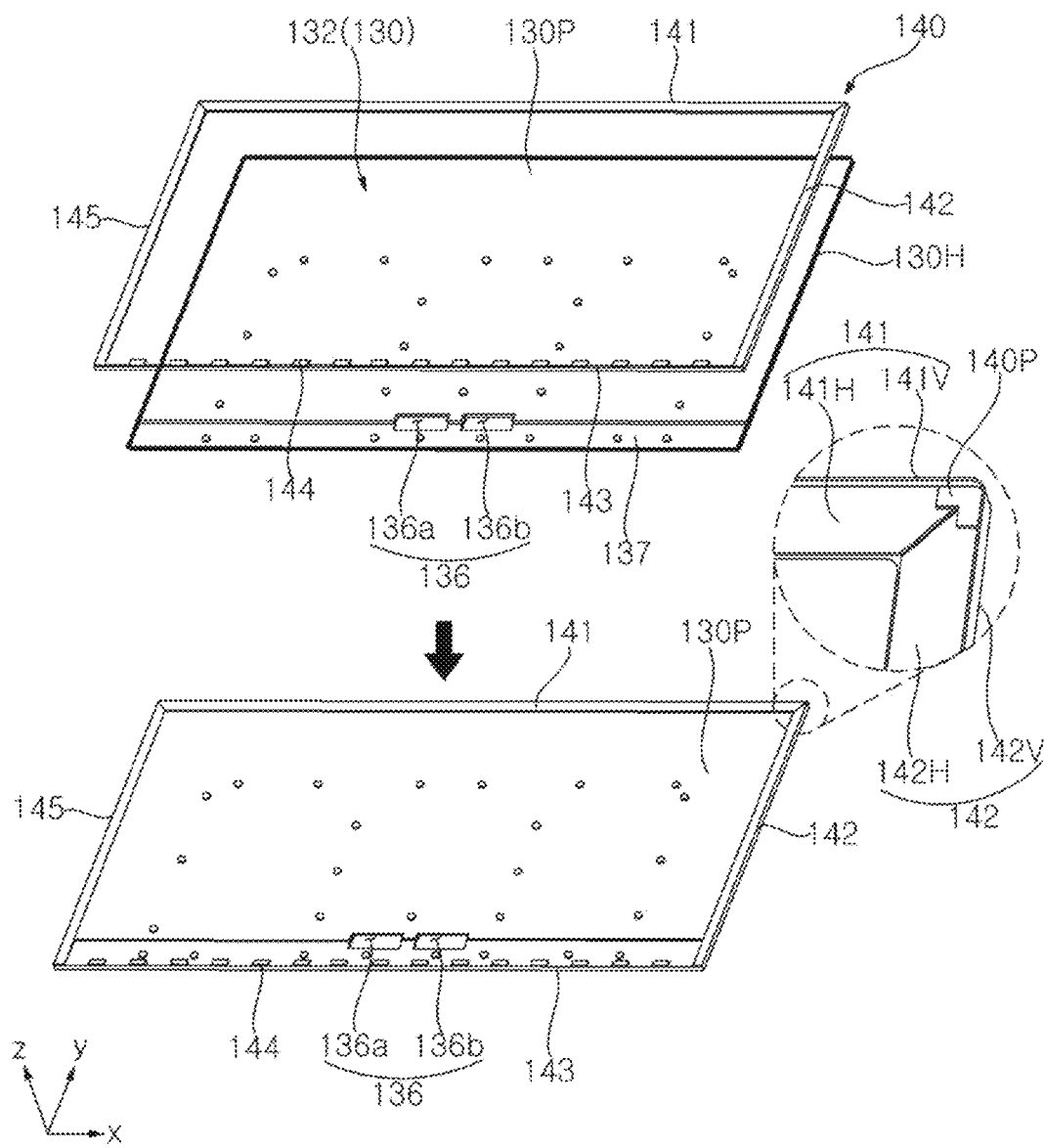

[FIG. 9]
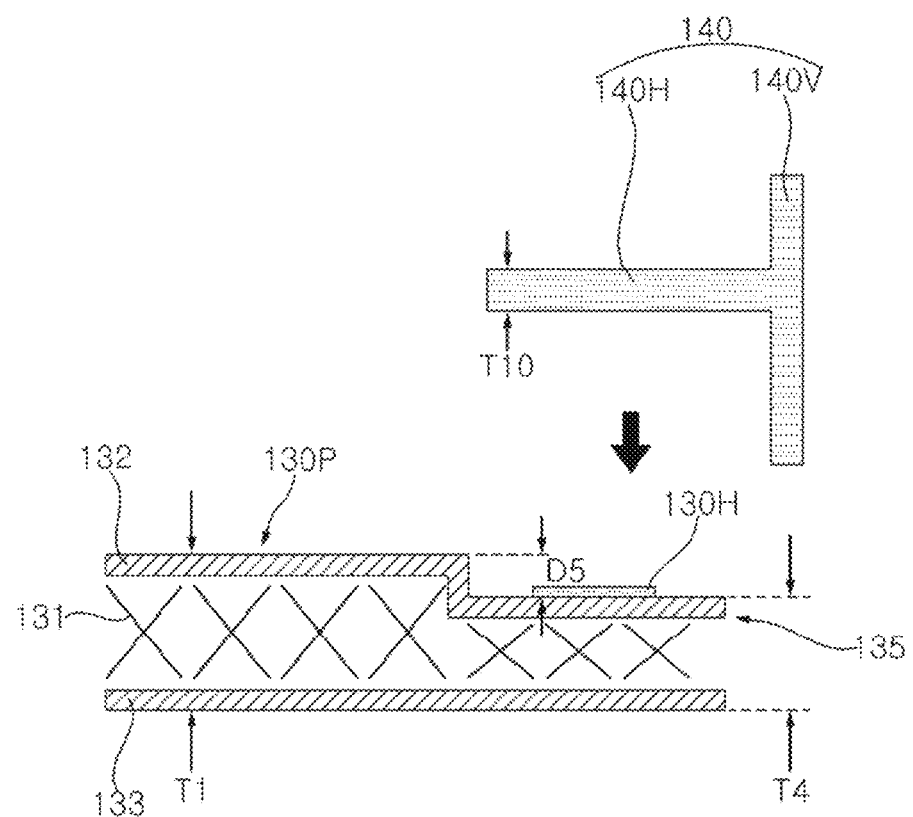

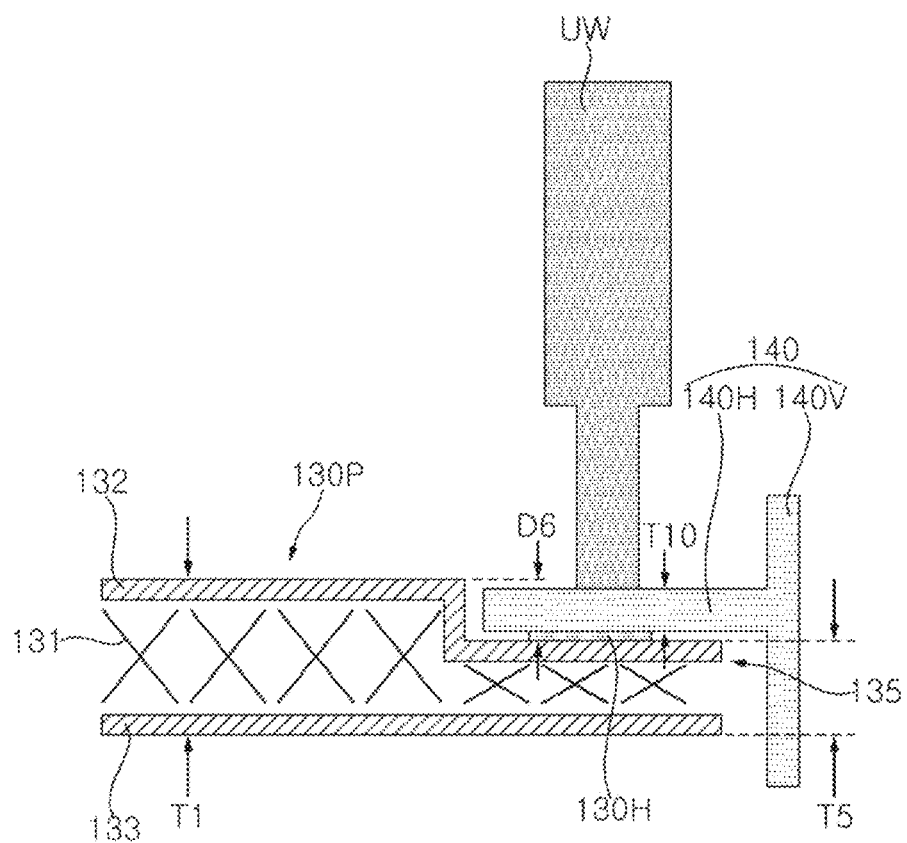
[FIG. 10]

[FIG. 11]
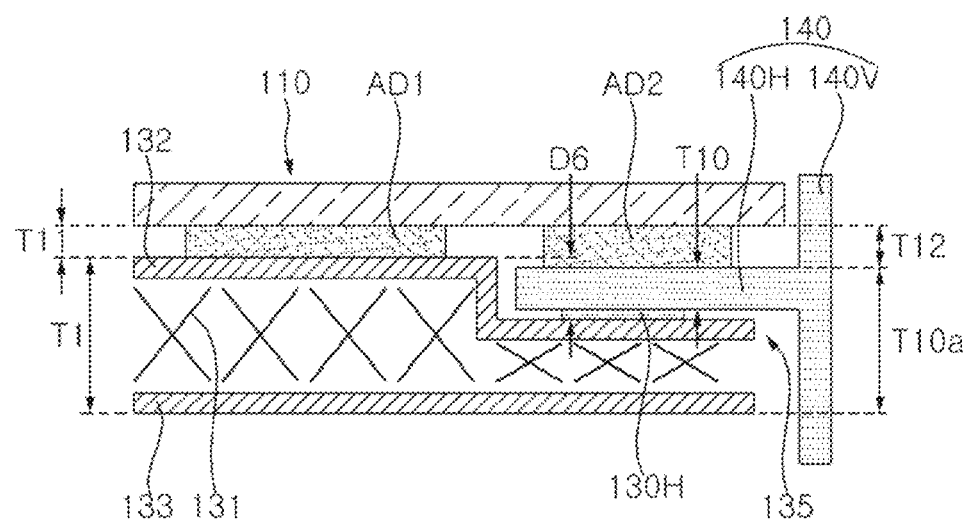

[FIG. 12]
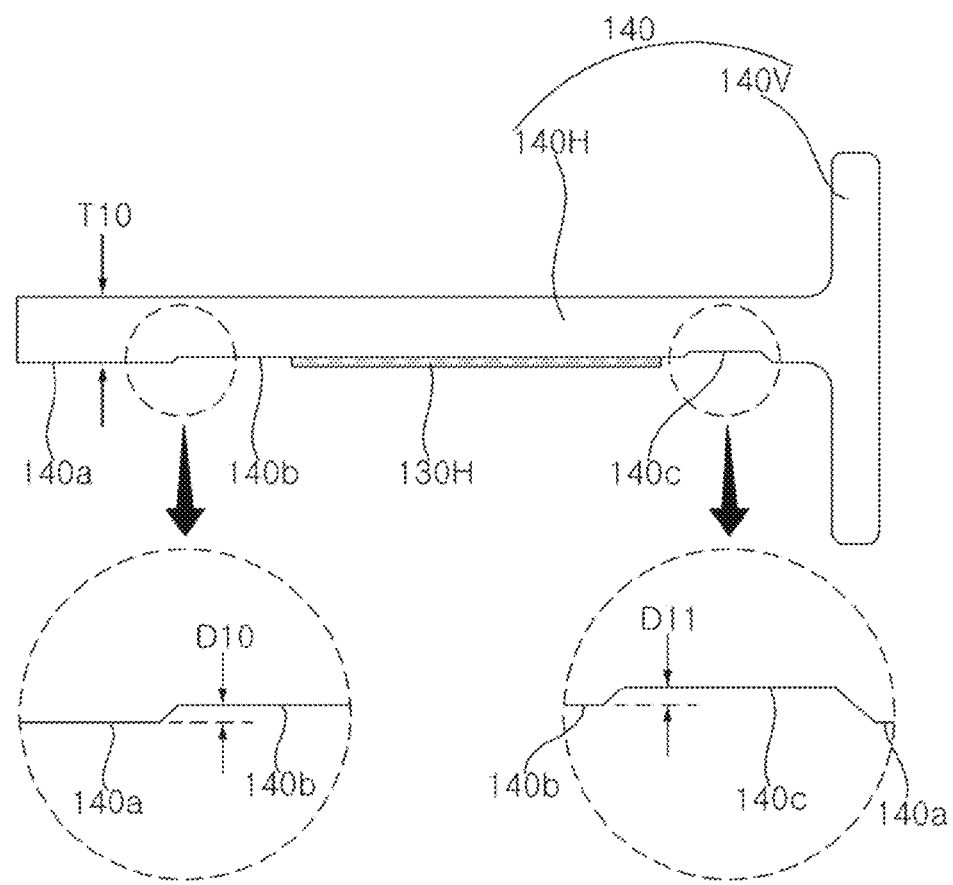

[FIG. 13]
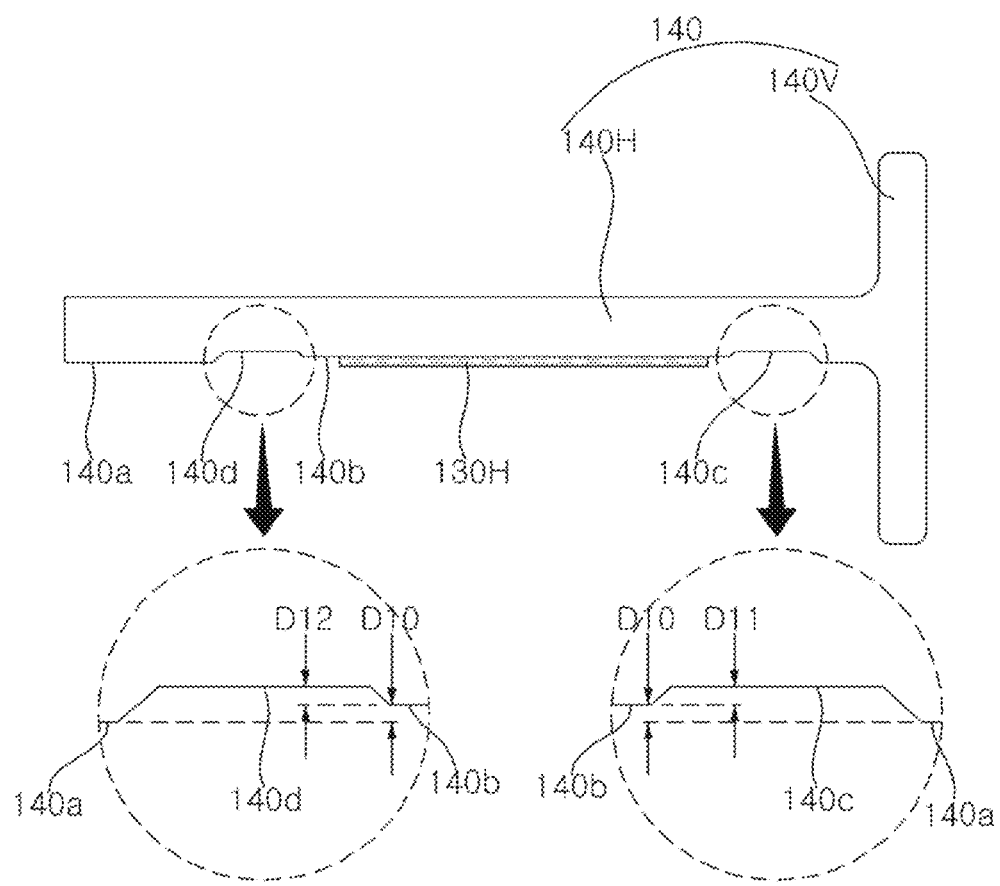

[FIG. 14]
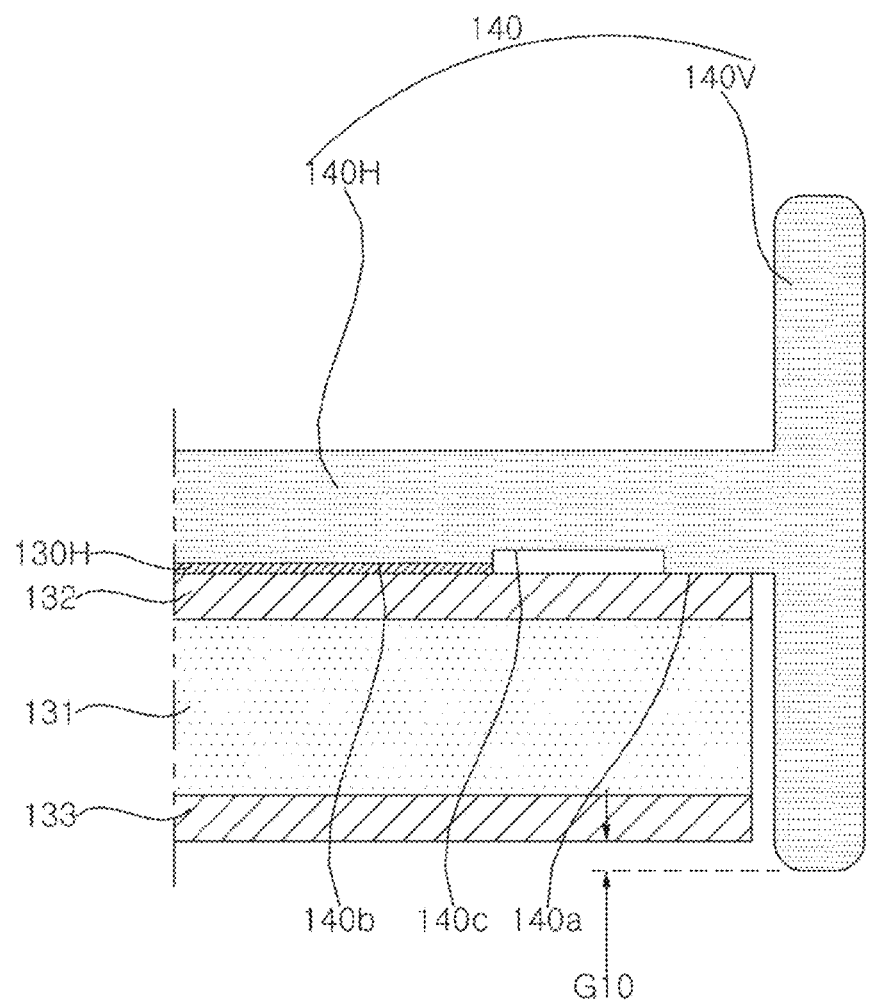

[FIG. 15]
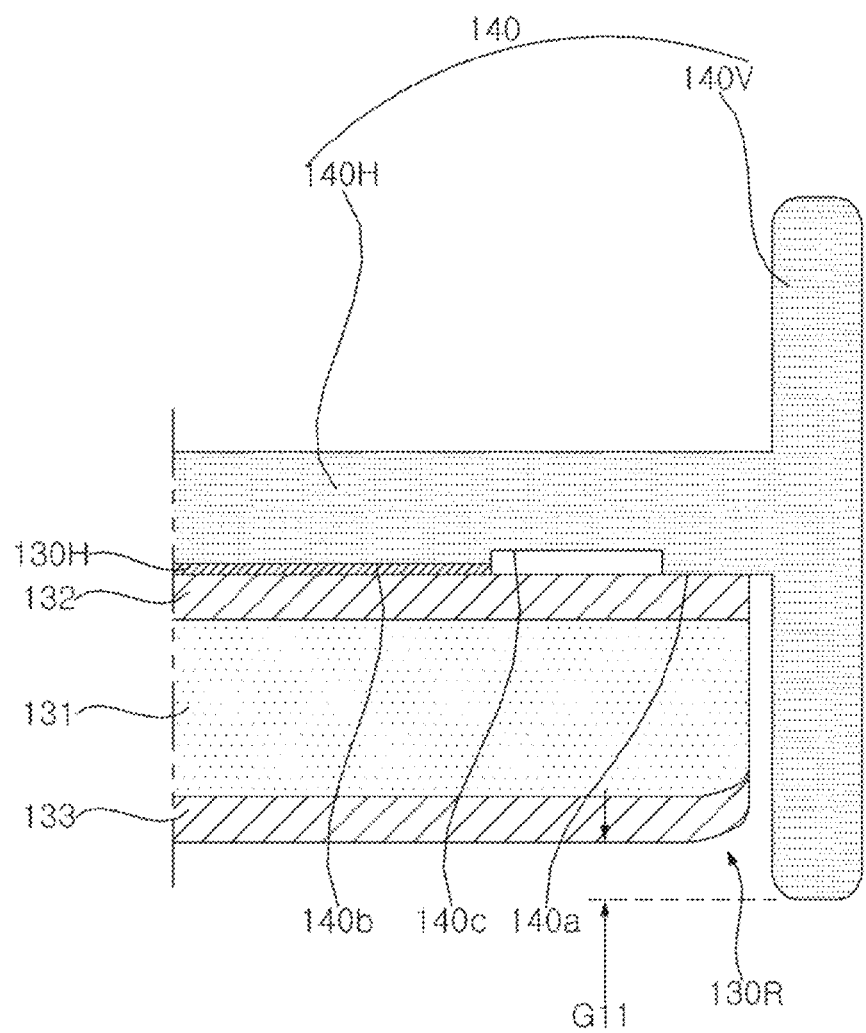

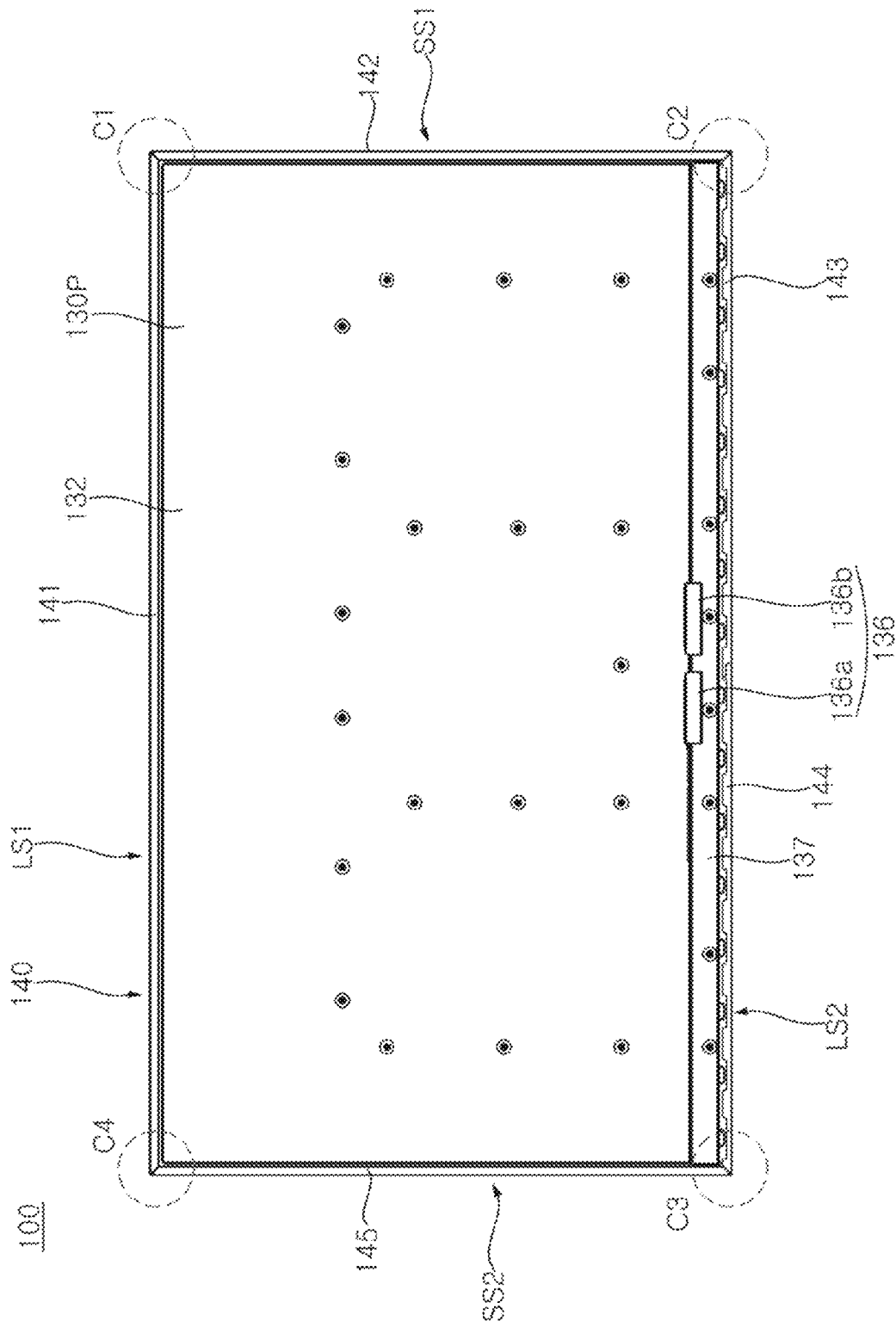

[FIG. 17]
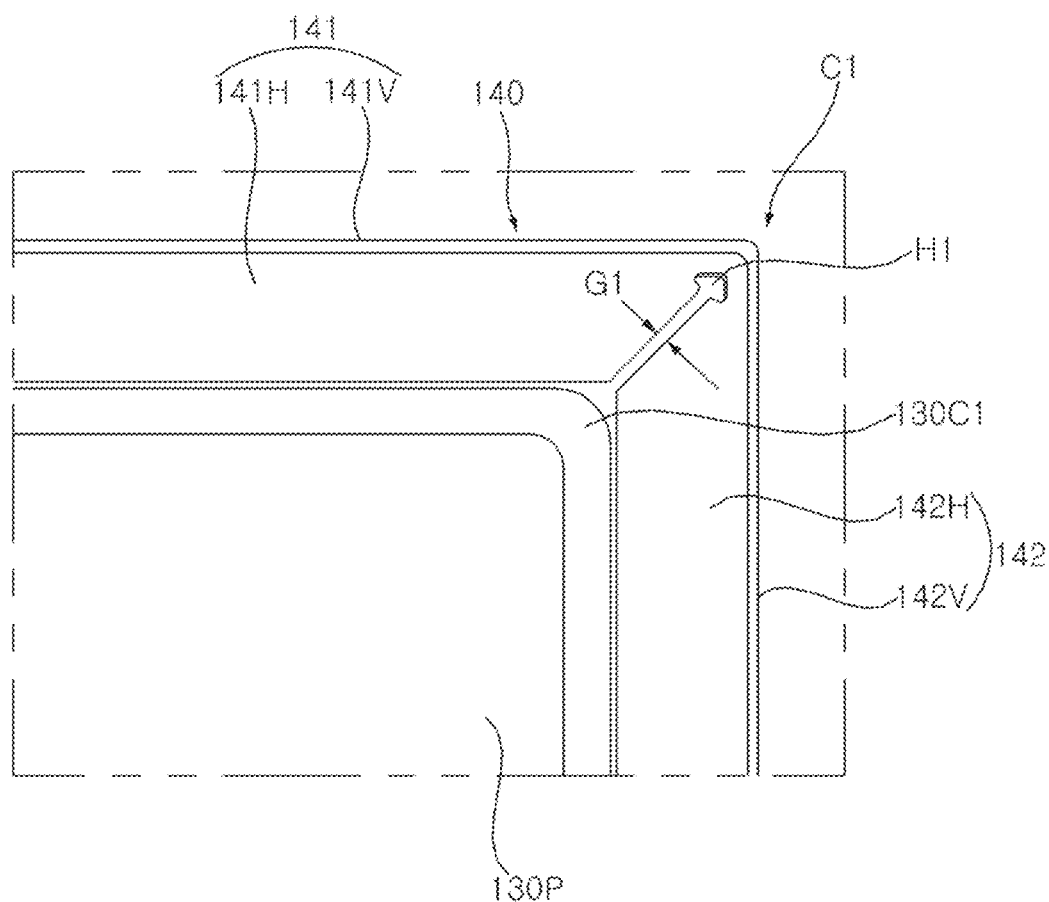

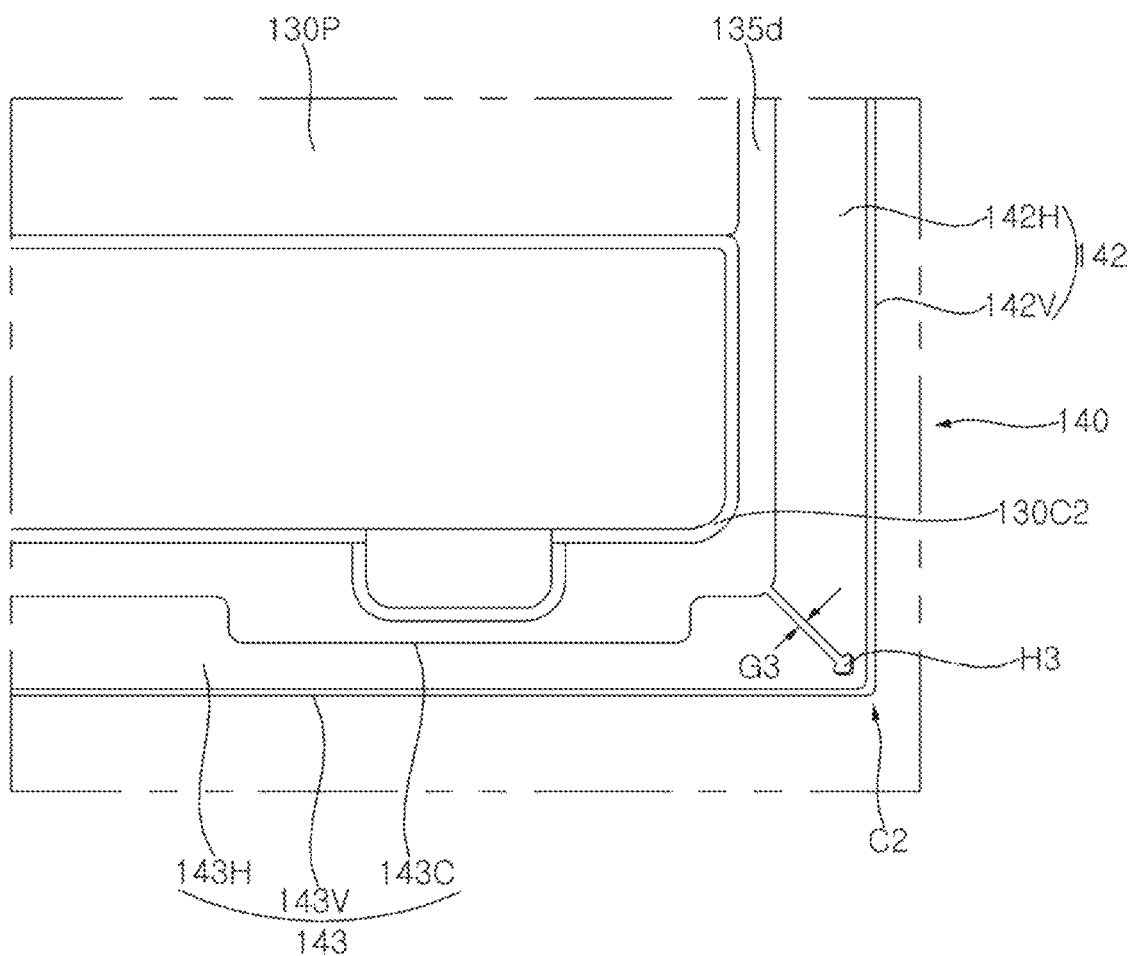
[FIG. 18]

[FIG. 19]
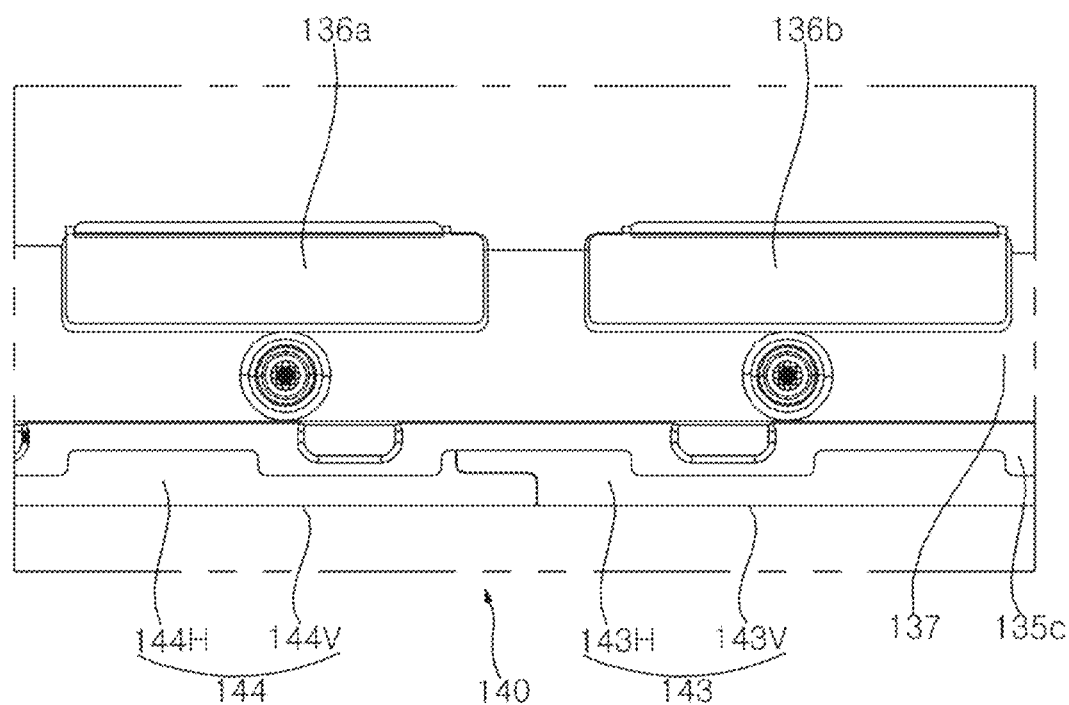

[FIG. 20]
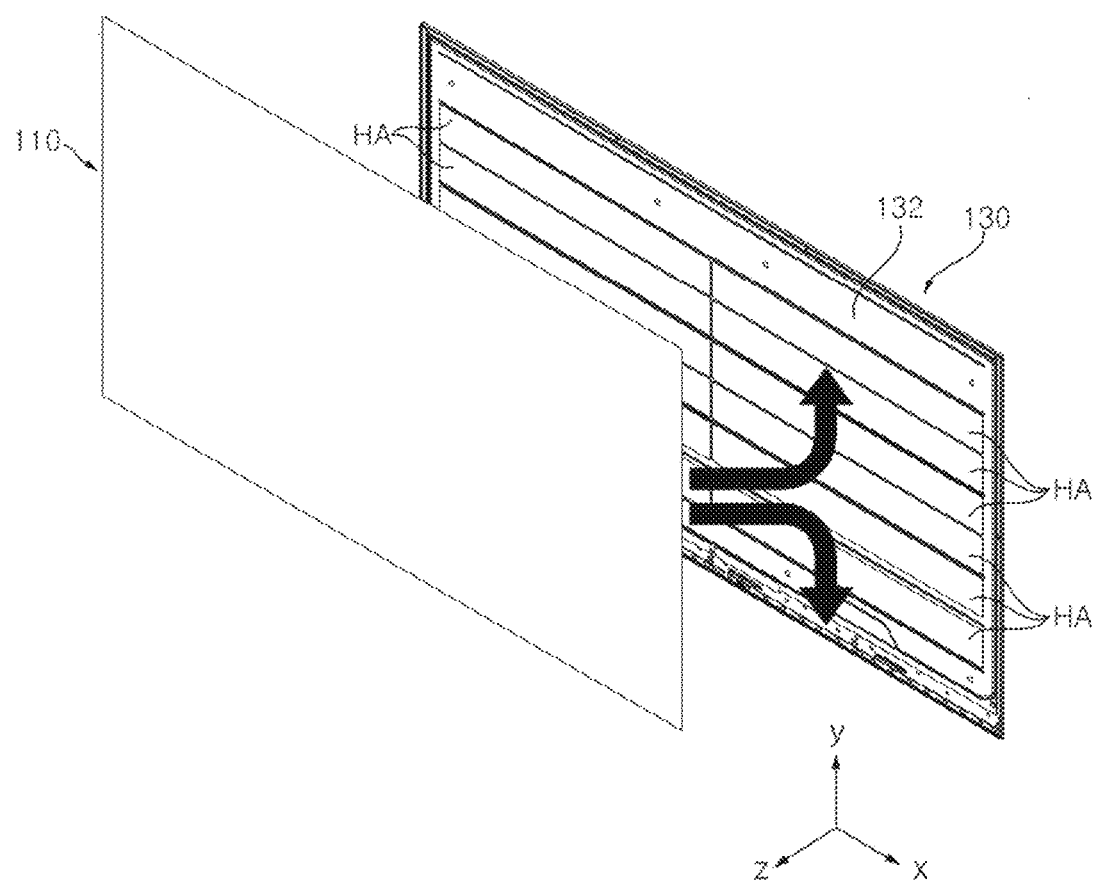

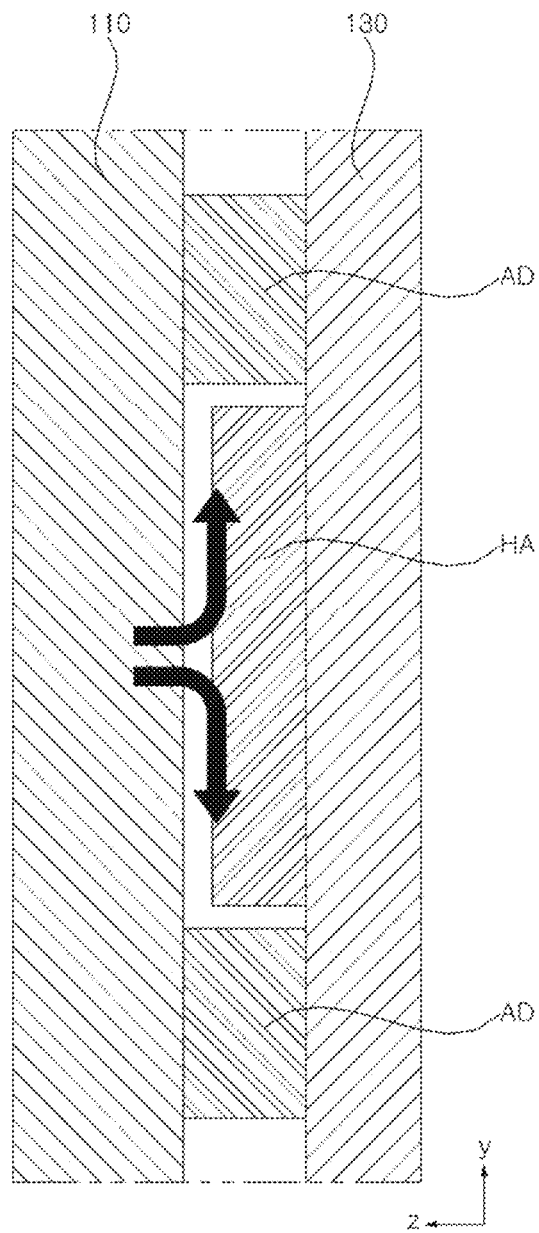
[FIG. 21]

[FIG. 22]
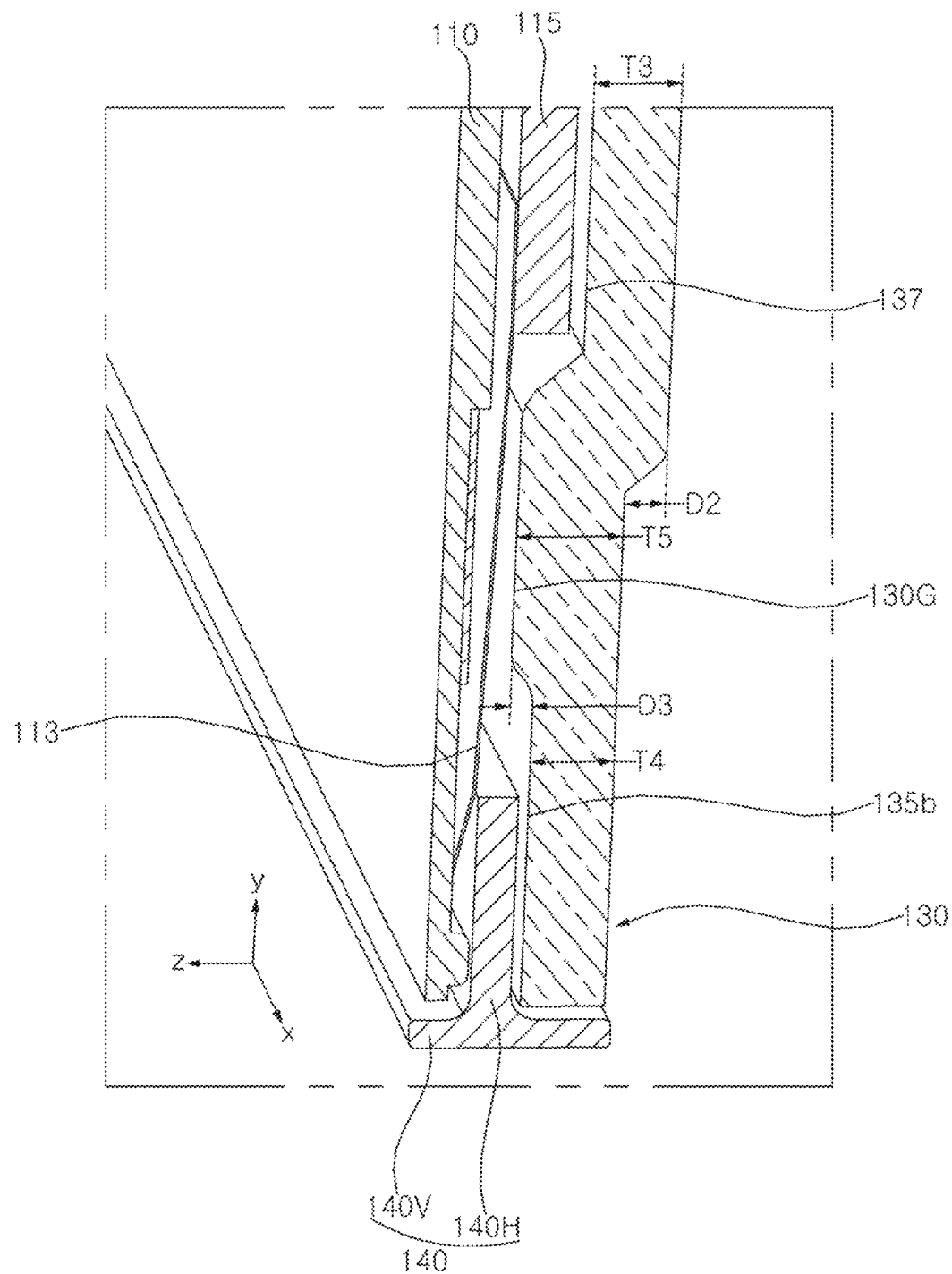

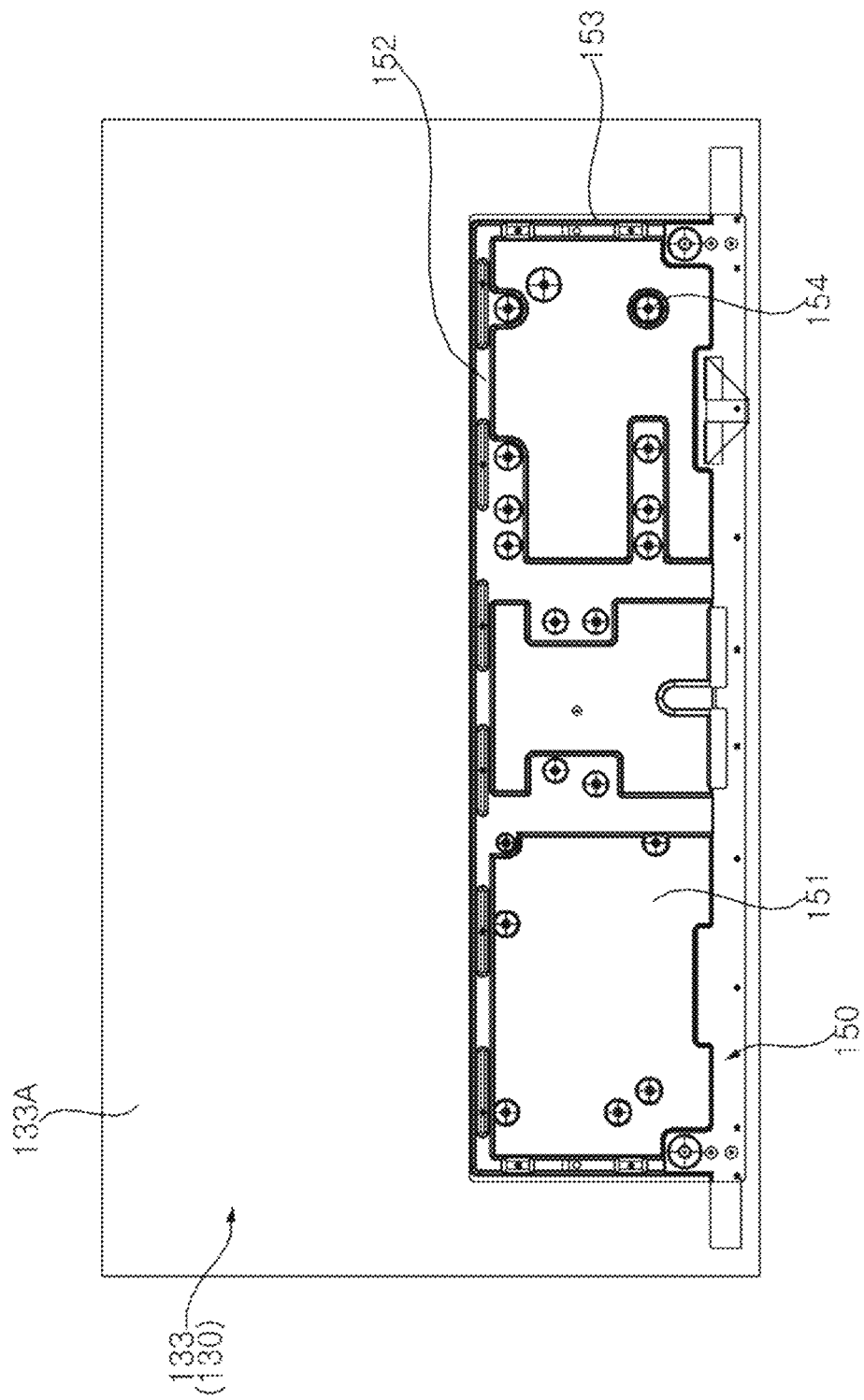
[FIG. 23]

[FIG. 24]
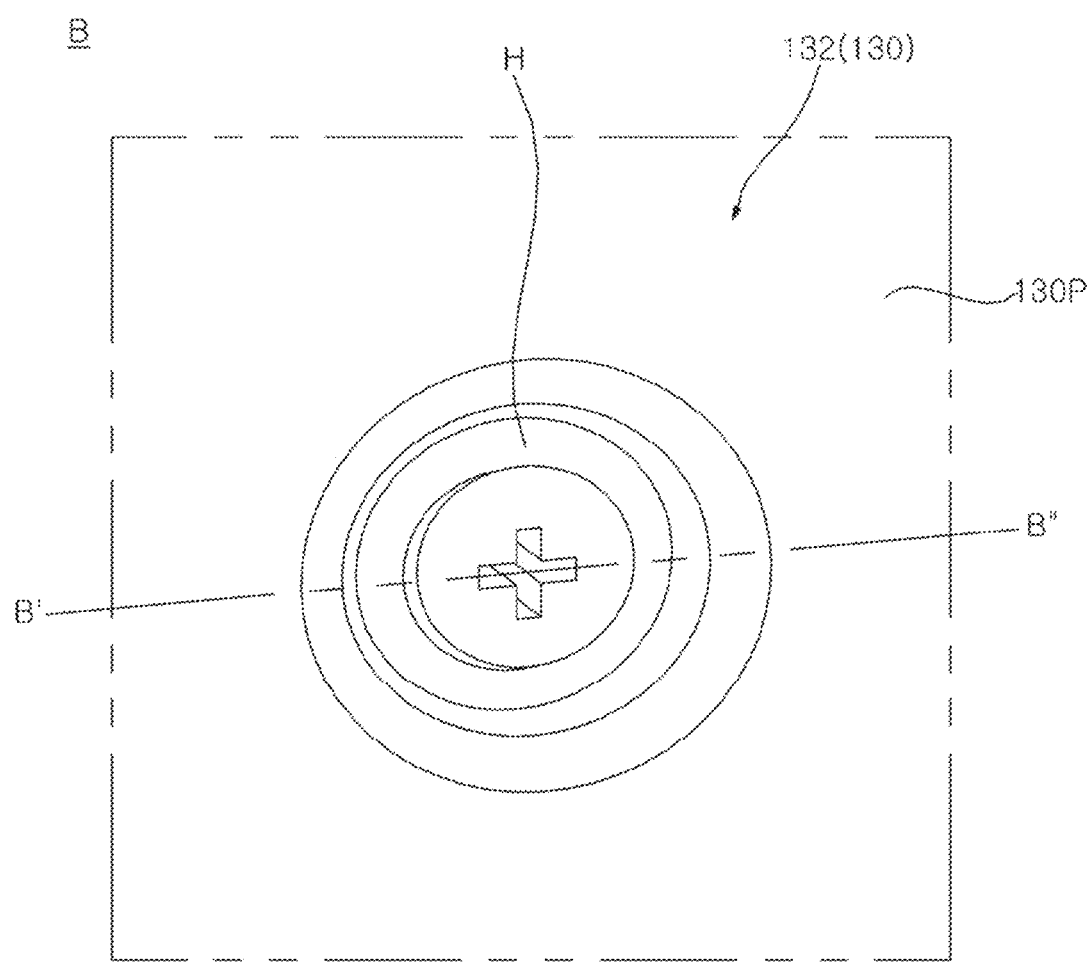

[FIG. 25]
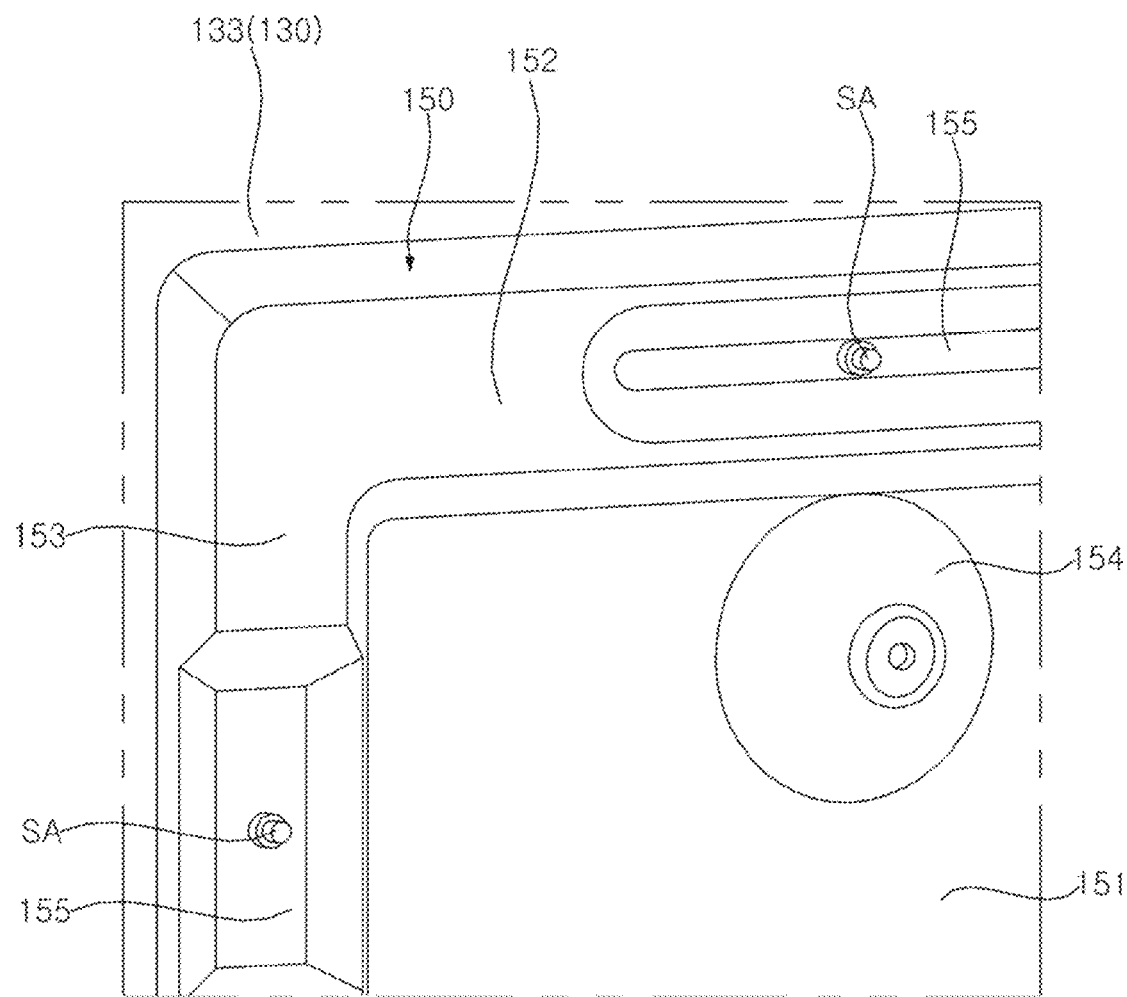

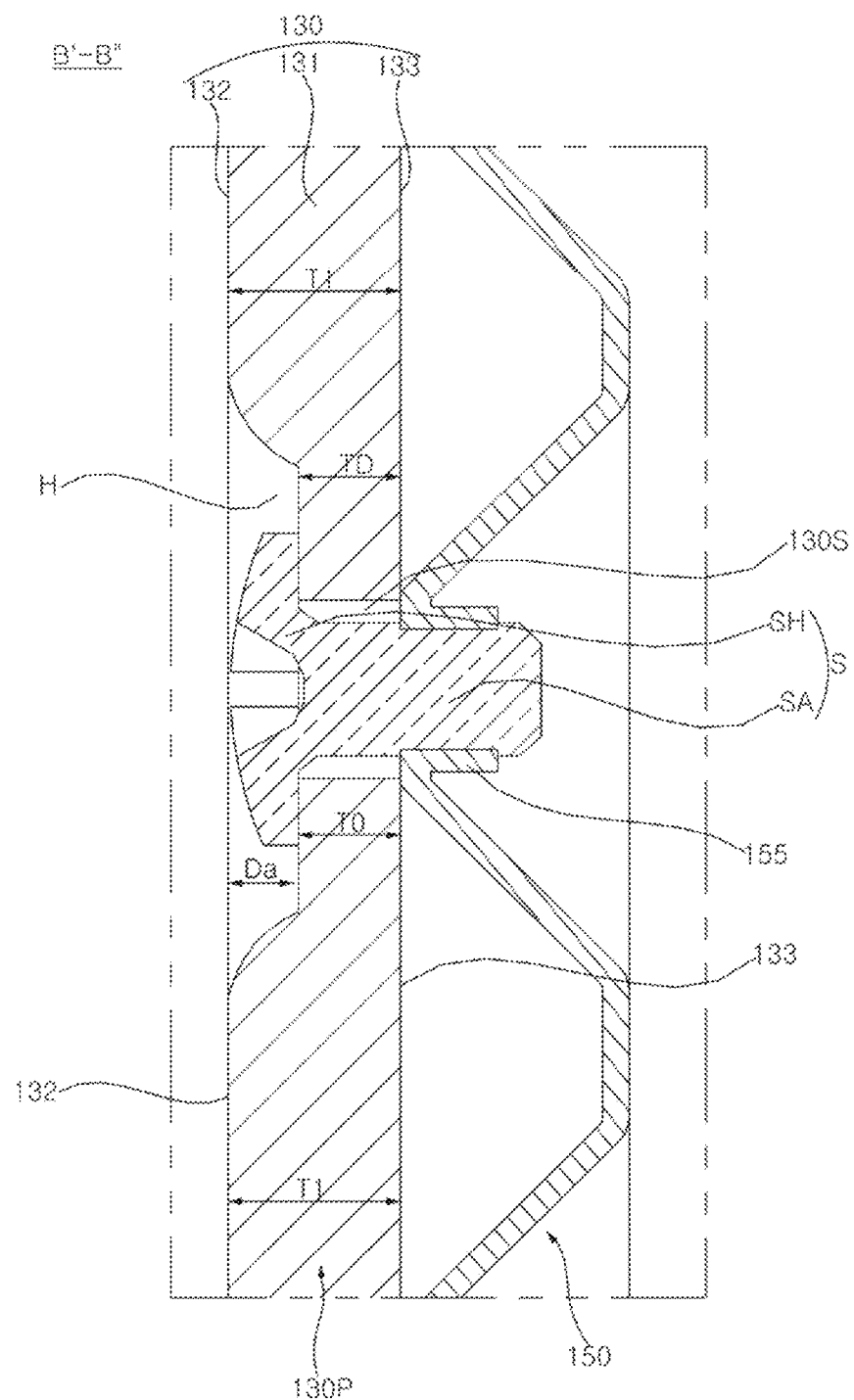
[FIG. 26]

DISPLAY DEVICE

CROSS REFERENCE TO RELATED APPLICATIONS

This application is the National Phase of PCT International Application No. PCT/KR2022/003060, filed on Mar. 4, 2022, all of which is hereby expressly incorporated by reference into the present application.

TECHNICAL FIELD

The present disclosure relates to a display device.

BACKGROUND ART

With the development of information society, there has been a growing demand for various types of display devices. In order to meet such demand, various display devices, such as a liquid crystal display (LCD), a plasma display panel (PDP), an electro luminescent display (ELD), a vacuum fluorescent display (VFD), an organic light emitting diode (OLED), and the like, have been developed and used.

Among them, an LCD panel includes a TFT substrate and a color substrate that face each other with a liquid crystal layer interposed therebetween, so as to display an image using light provided from a backlight unit. Meanwhile, an OLED panel can display an image by depositing a self-luminescent organic layer on a substrate having a transparent electrode formed thereon.

In particular, a display device using an organic light emitting diode (OLED) has excellent luminance and viewing angle characteristics compared to a liquid crystal display device, and requires no backlight unit, which is advantageous to achieve an ultra-thin profile.

Recently, numerous research has been conducted on an ultra-thin large screen display device.

DETAILED DESCRIPTION OF INVENTION

Technical Problems

It is an objective of the present disclosure to solve the above and other problems.

Another object may be to provide a structure that can achieve structural rigidity of an ultra-thin large screen display device.

Another object may be to provide a structure that can minimize warping caused by thermal deformation of a material complexed panel.

Another object may be to provide a structure that can minimize damage caused by thermal deformation of a material complexed panel and a PCB plate coupled to each other.

Another object may be to provide a structure that can achieve a desired level of thickness and flatness of an outer part of a material complexed panel to which a side frame is coupled.

Another object may be to provide a structure that can allow a side frame to be ultrasonic welded to a material complexed panel.

Another object may be to provide a structure that can prevent leakage of a hot-melt adhesive to the outside of a side frame during ultrasonic welding of a material complexed panel and the side frame.

Another object may be to provide a structure that can prevent a side surface of a material complexed panel from being exposed to the outside of a side frame due to thermal expansion of the material complexed panel.

Technical Solution

In accordance with an aspect of the present disclosure to achieve the above and other objectives, a display device may include: a display panel; a material complexed panel positioned behind the display panel, to which the display panel is coupled, and including fibers; and a side frame extending along a periphery of the material complexed panel, the side frame including: a horizontal part positioned between the display panel and the material complexed panel; and a vertical part intersecting the horizontal part and covering a side surface of the material complexed panel, wherein the material complexed panel may include an outer part adjacent to the periphery of the material complexed panel and formed by being recessed rearward from a front surface of the material complexed panel, and the horizontal part may face the outer part and may be coupled to the outer part.

Effect of Invention

The display device according to the present disclosure has the following effects.

According to at least one of the embodiments of the present disclosure, it is possible to provide a structure capable of achieving structural rigidity of an ultra-thin large screen display device.

According to at least one of the embodiments of the present disclosure, it is possible to provide a structure capable of minimizing warping caused by thermal deformation of a material complexed panel.

According to at least one of the embodiments of the present disclosure, it is possible to provide a structure capable of minimizing damage caused by thermal deformation of a material complexed panel and a PCB plate coupled to each other.

According to at least one of the embodiments of the present disclosure, it is possible to provide a structure capable of achieving a desired level of thickness and flatness of an outer part of a material complexed panel to which a side frame is coupled.

According to at least one of the embodiments of the present disclosure, it is possible to provide a structure capable of allowing a side frame to be ultrasonic welded to a material complexed panel.

According to at least one of the embodiments of the present disclosure, it is possible to provide a structure capable of preventing leakage of a hot-melt adhesive to the outside of a side frame during ultrasonic welding of a material complexed panel and the side frame.

According to at least one of the embodiments of the present disclosure, it is possible to provide a structure capable of preventing a side surface of a material complexed panel from being exposed to the outside of a side frame due to thermal expansion of the material complexed panel.

Further scope of applicability of the present disclosure will become apparent from the following detailed description. However, it should be understood that the detailed description and specific embodiments such as preferred embodiments of the present disclosure are given by way of example only, since various changes and modifications within the idea and scope of the present disclosure may be clearly understood by those skilled in the art.

BRIEF DESCRIPTION OF THE DRAWING

FIGS. 1 to 26 are diagrams illustrating examples of a display device according to embodiments of the present disclosure.

MODE FOR CARRYING OUT THE INVENTION

Description will now be given in detail according to exemplary embodiments disclosed herein, with reference to the accompanying drawings. For the sake of brief description with reference to the drawings, the same or equivalent components may be denoted by the same reference numbers, and description thereof will not be repeated.

In the following description, a suffix such as "module" and "unit" may be used to refer to elements or components. Use of such a suffix herein is merely intended to facilitate description of the specification, and the suffix itself is not intended to give any special meaning or function.

In the present disclosure, that which is well known to one of ordinary skill in the relevant art has generally been omitted for the sake of brevity. The accompanying drawings are used to help easily understand the technical idea of the present disclosure and it should be understood that the idea of the present disclosure is not limited by the accompanying drawings. The idea of the present disclosure should be construed to extend to any alterations, equivalents, and substitutes besides the accompanying drawings.

Although the terms "first", "second", etc. may be used herein to describe various elements, these elements should not be limited by these terms. These terms are only used to distinguish one element from another.

It will be understood that when a component is referred to as being "connected to" or "coupled to" another component, it may be directly connected to or coupled to another component, or intervening components may be present. In contrast, when a component is referred to as being "directly connected to" or "directly coupled to" another component, there are no intervening components present.

As used herein, a singular representation is intended to include a plural representation unless the context clearly indicates otherwise.

It will be further understood that the terms "comprises or includes" and/or "has" when used in this specification, specify the presence of a stated feature, number, step, operation, component, element, or combination thereof, but do not preclude the presence or addition of one or more other features, numbers, steps, operations, components, elements, or combinations thereof.

The directions "up (U)", "down (D)", "left (Le)", "right (Ri)", "front (F)", and "rear (R)" shown in the drawings are only for the convenience of description, and the technical concept disclosed in the specification is not limited by these directions.

Referring to FIG. 1, a display device 100 may include a display panel 110. The display panel 110 may display an image.

The display device 100 may include a first long side LS1, a second long side LS2 opposite the first long side LS1, a first short side SS1 adjacent to the first long side LS1 and the second long side LS2, and a second short side SS2 opposite the first short side SS1. For ease of explanation, it is illustrated and described that lengths of the first and second long sides LS1 and LS2 are greater than lengths of the first and second short sides SS1 and SS2, but the lengths of the first and second long sides LS1 and LS2 may be substantially equal to the lengths of the first and second short sides SS1 and SS2.

A direction parallel to the long sides LS1 and LS2 of the display device 100 may be referred to as a first direction DR1 or a left-and-right direction. A direction parallel to the short sides SS1 and SS2 of the display device 100 may be referred to as a second direction DR2 or an up-and-down direction. A direction perpendicular to the long sides LS1 and LS2 and the short sides SS1 and SS2 of the display device 100 may be referred to as a third direction DR3 or a front-and-rear direction.

A direction in which the display device 100 displays an image may be referred to as a front (F, z), and a direction opposite to the front may be referred to as a rear (R). The first short side SS1 may be referred to as a left side (Le, x). The second short side SS2 may be referred to as a right side (Ri). The first long side LS1 may be referred to as an upper side (U, y). The second long side LS2 may be referred to as a lower side (D).

The first long side LS1, the second long side LS2, the first short side SS1, and the second short side SS2 may be referred to as edges of the display device 100. In addition, points where the first long side LS1, the second long side LS2, the first short side SS1, and the second short side SS2 meet one another may be referred to as corners.

A point where the first short side SS1 and the first long side LS1 meet may be referred to as a first corner C1. A point where the first short side SS1 and the second long side LS2 meet may be referred to as a second corner C2. A point where the second short side SS2 and the second long side LS2 meet may be referred to as a third corner C3. A point where the second short side SS2 and the first long side LS1 meet may be referred to as a fourth corner C4.

Hereinafter, a display panel using an organic light emitting diode (OLED) will be described as an example of the display panel 110, but the display panel 110 applicable to the present disclosure is not limited thereto.

The display panel 110 may define a front surface of the display device 100, and may display an image forward. The display panel 110 may include a plurality of pixels to output an image in accordance with color, brightness, and chroma of each pixel. The display panel 110 may be divided into an active area in which an image is displayed and a de-active area in which no image is displayed. The display panel 110 may generate light corresponding to red, green, or blue color according to a control signal.

Referring to FIG. 2, a material complexed panel 130 may include a core 131, a front skin 132, and a rear skin 133. The core 131, the front skin 132, and the rear skin 133 may be coupled to each other. The material complexed panel 130 may be referred to as a fiber complexed panel 130, a fiber complexed plate 130, a material complexed plate 130, or a frame 130.

The front skin 132 may define a front surface of the material complexed panel 130. The rear skin 133 may define a rear surface of the material complexed panel 130. The front skin 132 and the rear skin 133 may include a metal material. For example, the front skin 132 and the rear skin 133 may include aluminum (Al). For example, the front skin 132 and the rear skin 133 may have a thickness of 0.5 mm. The front skin 132 and the rear skin 133 may be disposed opposite each other with respect to the core 131.

The core 131 may be positioned between the front skin 132 and the rear skin 133. The core 131 may include fibers. The core 131 may be formed of a composite material. The core 131 may include a main fiber and a binder fiber. The binder fiber may be mixed with the main fiber.

A hot-melt sheet may be disposed between the front skin 132 and the core 131, and a hot-melt sheet may be disposed between the rear skin 133 and the core 131. The hot-melt sheet may be a film. For example, the hot-melt sheet may be a film made of EVA, acrylic, polyurethane, or the like having a thickness of 50 μm or more. The core 131 and the hot-melt sheets may be laminated onto the front skin 132 and the rear skin 133 at a high temperature (e.g., about 190 to 200° C.) for 1 minute or more.

Accordingly, the material complexed panel 130 may increase bending rigidity and/or torsional rigidity of the display device.

Referring to FIGS. 3 and 4, the material complexed panel 130 may be manufactured by a process of pressing the front skin 132 and the rear skin 133 onto the core 131 using a plurality of rollers. Such a process may be referred to as a Roll-to-Roll (R2R) process.

Referring to FIG. 3, as a pinch roller Ra serving as a drive motor rotates, the front skin 132 may be unwound from a front drum Da, the rear skin 133 may be unwound from a rear drum Db, and the core 131 may be moved by passing through a feeding roller Rd. In addition, a first adhesive 134*a* for coupling the front skin 132 to the core 131 may be unwound from a first drum Dc. Also, a second adhesive 134*b* for coupling the rear skin 133 to the core 131 may be unwound from a second drum Db. In this case, the front skin 132, the first adhesive 134*a*, the core 131, the second adhesive 134*b*, and the rear skin 133 are stacked in this order, and may be guided toward an oven Ov by a guide roller Rc. The adhesives 134*a* and 134*b* may be hot-melt sheets 134*a* and 134*b*.

As the first and second adhesives 134*a* and 134*b* are melted in the oven Ov, the front skin 132 and the rear skin 133 may be coupled to the core 131. For example, the melting point of the first and second adhesives 134*a* and 134*b* may be about 150° C., and the ambient temperature of the oven Ov may be about 200° C. For example, the peel-off force of the first and second adhesives 134*a* and 134*b* may be about 10 kgf or more.

The front skin 132, the core 131, and the rear skin 133 that have passed through the oven Ov may be guided to a press roller Rb by the rotation of the pinch roller Ra, so as to be pressed by the press roller Rb. Accordingly, the coupling force among the front skin 132, the core 131, and the rear skin 133 may be further increased. The front skin 132, the core 131, and the rear skin 133, which are coupled to each other, may pass through the pinch roller Ra, and then may be cut by a cutter Ct to be produced as a material complexed panel 130 of a predetermined size.

Referring to FIG. 4, the press roller Rb or the pinch roller Ra may come into contact with an outer surface of each of the front skin 132 and the rear skin 133. When the press roller Rb or the pinch roller Ra rotates, the material complexed panel 130 may be moved in a longitudinal direction of the core 131. Here, the front skin 132 and the rear skin 133 may be coupled to the core 131 sequentially from one end to the other end in the longitudinal direction of the core 131.

In addition, the front skin 132 and the rear skin 133 of the material complexed panel 130 may be formed flat. That is, as a rear surface of the rear skin 133, which defines a rear surface of the display device 100, is formed flat, an additional process, such as painting the rear surface of the rear skin 133, attaching a sheet thereto, or the like, for an aesthetically pleasing appearance may be performed easily. Alternatively, the flat rear skin 133 itself may define the rear surface of the display device 100.

Meanwhile, in addition to the R2R process described above with reference to FIGS. 3 and 4, a process of sequentially stacking the front skin 132, the core 131, and the rear skin 133 followed by coupling the same may be used to manufacture the material complexed panel 130.

Referring to FIG. 5, the core 131 may include a main core 131*a* and a binder core 131*b*. The main core 131*a* may include a first fiber made of polyethylene terephthalate (PET) and a second fiber made of long material (LM). For example, the main core 131*a* may contain 50% of the first fiber and 50% of the second fiber. The binder core 131*b* may include an acrylic fiber.

The front skin 132 may include an aluminum (Al) material, and may be coupled to the binder core 131*b* by the first hot-melt adhesive 134*a*.

The rear skin 133 may include an aluminum (Al) material, and may be coupled to the main core 131*a* by the second hot-melt adhesive 134*b*.

The front skin 132 may be located closer to the display panel 110 (see FIG. 20) than the rear skin 133, and may be exposed to a relatively high temperature compared to the rear skin 133. In other words, there may be a temperature difference between the front skin 132 and the rear skin 133. For example, the temperature difference between the front skin 132 and the rear skin 133 may be about 4° C.

Here, the hot-melt adhesive 134*a*, 134*b* may have a structure including multi-layers of fiber materials (i.e., a multi-layered structure). The hot-melt adhesive 134*a*, 134*b* may include a first layer 1341, a second layer 1342, and a third layer 1343. For example, the first layer 1341, the second layer 1342, and the third layer 1343 may include a synthetic fiber material. For example, the first layer 1341 may include a nylon material, and may be sandwiched between the second layer 1342 and the third layer 1343. For example, the second layer 1342 and the third layer 1343 may include a polyurethane (PU) material.

Accordingly, elongation properties of the respective layers of the material complexed panel 130 may minimize warping caused by thermal deformation of the material complexed panel 130, which is due to a temperature difference between the front skin 132 and the rear skin 133.

Referring to FIG. 6, the material complexed panel 130 may include a flat part 130P, an outer part 135, and a receiving part 137. The front skin 132 of the material complex panel 130 may define a front surface of each of the flat part 130P, the receiving part 137, and the outer part 135.

The outer part 135 may be formed around the flat part 130P. The outer part 135 may be formed by being pressed rearward from the flat part 130P. A first outer part 135*a* may be formed along an upper side of the flat part 130P. A second outer part 135*b* may be formed along a left side of the flat part 130P. A third outer part 135*c* may be formed along a lower side of the flat part 130P. A fourth outer part 135*d* may be formed along a right side of the flat part 130P.

The receiving part 137 may be defined between the flat part 130P and the third outer part 135*c*. The receiving part 137 may be formed by being pressed rearward from the flat part 130P.

A cable hole 136 may be formed through the receiving part 137 in the front-and-rear direction. For example, a plurality of cable holes 136*a* and 136*b* may be adjacent to each other.

Referring to FIG. 7, a thickness T1 of the flat part 130P may be greater than a thickness T2 of the receiving part 137. A step D1 between the front skin 132 of the flat part 130P and the front skin 132 of the receiving part 137 may be greater than a step D2 between the rear skin 133 of the flat part 130P and the rear skin 133 of the receiving part 137.

A thickness T4 of the third outer part 135c may be greater than the thickness T2 of the receiving part 137. A step D2 between the rear skin 133 of the third outer part 135c and the rear skin 133 of the receiving part 137 may be equal to the step D2 between the rear skin 133 of the flat part 130P and the rear skin 133 of the receiving part 137.

A protruding pad 138 may protrude forward from the front skin 132 of the third outer part 135c. A thickness T3 of the protruding pad 138 may be greater than the thickness T4 of the third outer part 135c, may be less than the thickness T2 of the receiving part 137, and may be less than the thickness T1 of the flat part 130P. A step D4 between the front skin 132 of the protruding pad 138 and the front skin 132 of the third outer part 135c may be less than the step D1 and the step D2.

Referring to FIG. 8, a side frame 140 may extend along a periphery of the material complexed panel 130. The side frame 140 may be coupled to the front skin 132 of the outer part 135 (see FIG. 6) of the material complexed panel 130 by a hot-melt adhesive 130H. For example, the side frame 140 may include a metal material such as aluminum (Al). The side frame 140 may be referred to as a guide panel or a middle cabinet.

Referring to FIGS. 9 and 10, the side frame 140 may include a vertical part 140V and a horizontal part 140H. The vertical part 140V may extend in the front-and-rear direction, and may cover a side surface of the material complexed panel 130. The horizontal part 140H may extend from the vertical part 140V in a direction intersecting the vertical part 140V, and may be positioned at the front of the outer part 135.

Referring to FIG. 9, the outer part 135 may be made by forging, which involves the front skin 132 of the flat part 130P being pressed rearward. After forging, restriking may be performed to flatten the outer part 135. For example, a thickness T1 of the flat part 130P may be 4.0 mm, and a thickness T4 of the outer part 135 may be 3.0 mm. The hot-melt adhesive 130H may be applied onto the outer part 135, and may be positioned between the outer part 135 and the horizontal part 140H.

Referring to FIG. 10, a horn UW of an ultrasonic welder may be placed on a front surface of the horizontal part 140H, so as to apply ultrasonic vibration to the horizontal part 140H and the hot-melt adhesive 130H. Accordingly, the horizontal part 140H may be ultrasonic welded to the outer part 135 through the hot-melt adhesive 130H. Here, the front skin 132 of the outer part 135 may be pressed toward the rear skin 133 by the horn UW, and accordingly, a thickness T5 of the outer part 135 may be reduced. For example, the thickness T5 of the outer part 135 may be 2.4 to 2.5 mm. That is, a pressed amount of the outer part 135 by the horn UW may be 0.5 to 0.6 mm. As the outer part 135 is pressed during the ultrasonic welding described above, namely, under high-temperature conditions, the outer part 135 may retain its shape without spring-back.

Referring to FIGS. 10 and 11, a sum T10a of the thickness T5 of the outer part 135, a thickness of the hot-melt adhesive 130H, and a thickness T10 of the horizontal part 140H may be less than the thickness T1 of the flat part 130P. For example, the thickness T1 of the flat part 130P may be 4.0 mm. For example, the thickness T5 of the outer part 135 may be 2.4 to 2.5 mm, the thickness of the hot-melt adhesive 130H may be 0.1 mm, and the thickness T10 of the horizontal part 140H may be 1.1 mm, and therefore the sum T10a of them may be 3.6 to 3.7 mm.

The display panel 110 may be positioned at the front of the horizontal part 140H. A first adhesive member AD1 may be disposed between the front skin 132 of the flat part 130P and a rear surface of the display panel 110, and may be coupled to the flat part 130P and the display panel 110. For example, a thickness T11 of the first adhesive member AD1 may be 0.5 mm. A second adhesive member AD2 may be disposed between the front surface of the horizontal part 140H and the rear surface of the display panel 110, and may be coupled to the horizontal part 140H and the display panel 110. For example, a thickness T12 of the second adhesive member AD2 may be 0.8 to 0.9 mm. For example, the adhesive member AD1, AD2 may be a double-sided tape.

Accordingly, the display panel 110 may be coupled to the material complexed panel 130 and the side frame 140, and may be positioned flat with respect to the material complexed panel 130. In addition, the vertical part 140V may cover a side surface of the display panel 110.

Referring to FIGS. 12 and 13, an adhesive portion 140b may be formed by being recessed forward from a rear surface 140a of the horizontal part 140H. The adhesive portion 140b may extend in a width direction of the horizontal part 140H. In the width direction of the horizontal part 140H, the adhesive portion 140b may be positioned between one end and the other end of the horizontal part 140H. For example, a depth D10 of the adhesive portion 140b relative to the rear surface 140a of the horizontal part 140H may be 0.1 to 0.2 mm. The hot-melt adhesive 130H may be positioned on the adhesive portion 140b. That is, the hot-melt adhesive 130H (see FIGS. 6 and 8) applied onto the outer part 135 may contact the adhesive portion 140b and may have a shape corresponding to the adhesive portion 140b.

Referring to FIG. 12, a recessed portion 140c may be formed by being recessed forward from the adhesive portion 140b. In the width direction of the horizontal part 140H, the recessed portion 140c may be positioned at or adjacent to one end of the adhesive portion 140b. For example, the recessed portion 140c may be positioned at a first end of the adhesive portion 140b that is adjacent to the vertical part 140V. As another example, the recessed portion 140c may be positioned at a second end of the adhesive portion 140b that is opposite the first end of the adhesive portion 140b. For example, a depth D11 of the recessed portion 140c relative to the adhesive portion 140b may be 0.1 to 0.2 mm. In other words, a depth of the recessed portion 140c relative to the rear surface 140a of the horizontal part 140H may be 0.2 to 0.4 mm. The recessed portion 140c may be referred to as a ditch.

Accordingly, when the horizontal part 140H and the outer part 135 (see FIG. 10) are coupled to each other, the recessed portion 140c may minimize leakage of the hot-melt adhesive 130H to an outside of the horizontal part 140H.

Referring to FIG. 13, a first recessed portion 140c and a second recessed portion 140d may be formed by being recessed forward from the adhesive portion 140b. In the width direction of the horizontal part 140H, the first recessed portion 140c may be positioned at or adjacent to a first end of the adhesive portion 140b, and the second recessed portion 140d may be positioned at or adjacent to a second end of the adhesive portion 140b. For example, a depth D11 of the first recessed portion 140c relative to the adhesive portion 140b may be 0.1 to 0.2 mm. For example, a depth D12 of the second recessed portion 140d relative to the adhesive portion 140b may be 0.1 to 0.2 mm. For example, the depth D12 may be equal to the depth D11.

Accordingly, when the horizontal part 140H and the outer part 135 (see FIG. 10) are coupled to each other, the first recessed portion 140c and the second recessed portion 140d may minimize leakage of the hot-melt adhesive 130H to an outside of the horizontal part 140H.

Referring to FIGS. 14 and 15, in a high-temperature environment, the core 131 may be inflated or expanded, which may lead to an increase in thickness of the core 131. For example, as the temperature increases, the thickness of the core 131 may increase by 0.5 mm.

Referring to FIG. 14, a rear end of the vertical part 140V may protrude further rearward by a first length G10 than the rear surface of the rear skin 133 of the material complexed panel 130. The first length G10 may be less than a thickness increase value of the core 131 due to an increase of the temperature. For example, the first length G10 may be 0.2 mm. In this case, when the core 131 expands as the temperature increases, a portion of a side surface of the core 131 may be exposed to an outside of the vertical part 140V.

Referring to FIG. 15, a rear end of the vertical part 140V may protrude further rearward by a second length G11 than the rear surface of the rear skin 133 of the material complexed panel 130. The second length G11 may be greater than or equal to a thickness increase value of the core 131 due to an increase of the temperature. For example, the second length G11 may be 0.5 mm. Accordingly, even when the core 131 expands as the temperature increases, a side surface of the core 131 may not be exposed to an outside of the vertical part 140V.

In addition, an edge 130R of the rear surface of the material complexed panel 130 may be rounded. In other words, an edge of the rear skin 133 may be rounded, and a portion of the core 131 that corresponds to the rounded edge of the rear skin 133 may also be rounded. For example, a radius of curvature of the edge 130R may be 0.3 mm. That is, even when the thickness of the core 131 increases by a certain level more than the second length G11 as the temperature increases, the side surface of the core 131 may not be exposed to the outside of the vertical part 140V. Alternatively, even when the second length G11 is less than a thickness increase value of the core 131 due to an increase of the temperature, the side surface of the core 131 may not be exposed to the outside of the vertical part 140V within a certain range.

Thus, due to the rounded shape of the edge 130R, it is possible to minimize the second length G11 required to prevent exposure of the side surface of the core 131.

Referring to FIGS. 8 and 16, the side frame 140 may include a first part 141, a second part 142, a third part 143, a fourth part 144, and a fifth part 145.

The first part 141 may extend along the first outer part 135a (see FIG. 6), and may include a first horizontal part 141H and a first vertical part 141V. The first horizontal part 141H may be parallel to the first outer part 135a, and may be fixed on the first outer part 135a by the hot-melt adhesive 130H. The first vertical part 141V may intersect the first horizontal part 141H, and may cover the top of the material complexed panel 130.

The second part 142 may be bent downward from a left end of the first part 141 (see the first corner C1), and may include a second horizontal part 142H and a second vertical part 142V. The second horizontal part 142H may be parallel to the second outer part 135b, and may be fixed on the second outer part 135b by the hot-melt adhesive 130H. The second vertical part 142V may intersect the second horizontal part 142H, and may cover the left side of the material complexed panel 130.

The third part 143 may be bent rightward from a lower end of the second part 142 (see the second corner C2), and may include a third horizontal part 143H (see FIG. 18) and a third vertical part 143V (see FIG. 18). The third horizontal part 143H may be parallel to the third outer part 135c, and may be fixed on the third outer part 135c by the hot-melt adhesive 130H. The third vertical part 143V may intersect the third horizontal part 143H, and may cover the bottom of the material complexed panel 130.

The fourth part 144 may be aligned with the third part 143 along the third outer part 135c, and an end of the fourth part 144 may be connected to an end of the third part 143. The fourth part 144 may include a fourth horizontal part 144H (see FIG. 19) and a fourth vertical part 144V (see FIG. 19). The fourth horizontal part may be parallel to the third outer part 135c, and may be fixed on the third outer part 135c by the hot-melt adhesive 130H. The fourth vertical part may intersect the fourth horizontal part, and may cover the bottom of the material complexed panel 130.

The fifth part 145 may be bent downward from a right end of the first part 141 (see the fourth corner C4), and the fourth part 144 may be bent leftward from a lower end of the fifth part 145 (see the third corner C3). The fifth part 145 may include a fifth horizontal part and a fifth vertical part. The fifth horizontal part may be parallel to the fourth outer part 135d, and may be fixed on the fourth outer part 135d by the hot-melt adhesive 130H. The fifth vertical part may intersect the fifth horizontal part, and may cover the right side of the material complexed panel 130.

Referring to FIGS. 17 and 18, a gap G1 may be formed between the first horizontal part 141H of the first part 141 and the second horizontal part 142H of the second part 142. The first vertical part 141V of the first part 141 and the second vertical part 142V of the second part 142 may be connected while being bent. A hole H1 may be adjacent to the vertical parts 141V and 142V, may be connected to the gap G1, and may have a larger diameter than the gap G1.

In addition, a gap like the gap G1 may be formed between the first horizontal part 141H of the first part 141 and the fifth horizontal part of the fifth part 145 (see FIG. 16). The first vertical part 141V of the first part 141 and the fifth vertical part of the fifth part 142 may be connected while being bent. A hole like the hole H1 may be adjacent to the first vertical part 141V and the fifth vertical part.

A gap G3 may be formed between the second horizontal part 142H of the second part 142 and the third horizontal part 143H of the third part 143. The second vertical part 142V of the second part 142 and the third vertical part 143V of the third part 143 may be connected while being bent. A hole H3 may be adjacent to the vertical parts 142V and 143V, may be connected to the gap G3, and may have a larger diameter than the gap G3.

In addition, a gap like the gap G3 may be formed between the fifth horizontal part of the fifth part 145 (see FIG. 16) and the fourth horizontal part of the fourth part 144 (see FIG. 16). The fifth vertical part of the fifth part 145 and the fourth vertical part of the fourth part 144 may be connected while being bent. A hole like the hole H3 may be adjacent to the fifth vertical part and the fourth vertical part.

Referring to FIG. 17, a corner 130C1 adjacent to the first corner C1 of the flat part 130P may be rounded. For example, a radius of curvature of the corner 130C1 may be 10 mm. Accordingly, in the aforementioned processes of forging the outer part 135 relative to the flat part 130P and pressing the outer part 135 by using the horn UW (see FIG. 10) of the ultrasonic welder, it may be advantageous to maintain flatness of a portion (see FIG. 6) adjacent to the first corner C1 between the first outer part 135a and the second outer part 135b.

In addition, a corner adjacent to the fourth corner C4 (see FIG. 16) of the flat part 130P may also be rounded like the corner 130C1.

Referring to FIG. 18, a corner 130C2 adjacent to the second corner C2 of the flat part 130P may be rounded. For example, a radius of curvature of the corner 130C2 may be 10 mm. Accordingly, in the aforementioned processes of forging the outer part 135 relative to the flat part 130P and pressing the outer part 135 by using the horn UW (see FIG. 10) of the ultrasonic welder, it may be advantageous to maintain flatness of a portion (see FIG. 6) adjacent to the second corner C2 between the second outer part 135b and the third outer part 135c.

In addition, a corner adjacent to the third corner C3 (see FIG. 16) of the flat part 130P may also be rounded like the corner 130C2.

Referring to FIG. 19, the third horizontal part 143H of the third part 143 may be in contact with the fourth horizontal part 144H of the fourth part 144. The third vertical part 143V of the third part 143 may be in contact with the fourth vertical part 144V of the fourth part 144. An end of the third part 143 may be coupled to an end of the fourth part 144. For example, the end of the third part 143 may be welded to the end of the fourth part 144.

Referring to FIGS. 20 and 21, the display panel 110 may be coupled on the front skin 132 of the material complexed panel 130 by an adhesive member AD such as a double-sided tape.

A heatsink HA may be positioned in an air gap between the display panel 110 and the material complexed panel 130, and may be coupled on the front skin 132. For example, a plurality of heat sinks HA may be coupled on the front skin 132. The heat sink HA may include a metal material. For example, the heat sink HA may be a plate or tape made of aluminum (Al).

Accordingly, the air gap between the display panel 110 and the material complexed panel 130 may be reduced by the heat sink HA, allowing heat generated in the display panel 110 to be removed effectively.

Referring to FIG. 22, a cable 113 may extend from a lower side of the display panel 110 to between the display panel 110 and the material complexed panel 130.

A source PCB 115 may be positioned in the receiving part 137 of the material complexed panel 130. The source PCB 115 may be electrically connected to the cable 113.

The side frame 140 may extend along a periphery of the display panel 110. The horizontal part 140H may be positioned between the display panel 110 and the material complexed panel 130. The vertical part 140V may cover the side surface of the display panel 110 and the side surface of the material complexed panel 130.

Referring to FIG. 23, a PCB plate 150 may be positioned at the rear of the material complexed panel 130. For example, the PCB plate 150 may be located closer to a lower side than to an upper side of the material complexed panel 130. The PCB plate 150 may include a metal material. For example, the PCB plate 150 may include an electrolytic galvanized iron (EGI) material.

A horizontal portion 152, a vertical portion 153, and a dome portion 154 of the PCB plate 150 may be formed by being pressed rearward from a front surface of a body 151 of the PCB plate 150. The horizontal portion 152 may extend in the left-and-right direction. The vertical portion 153 may extend in the up-and-down direction. A plurality of PCBs (not shown) may be positioned at the rear of the PCB plate 150 and may be mounted on the body 151.

For example, a power supply board may be mounted on a first area of the body 151, and may provide power to each of the components of the display device. A timing controller (T-CON) board may be mounted on a second area of the body 151, and may provide an image signal to the display panel 110. A main board may be mounted on a third area of the body 151, and may control each of the components of the display device.

Meanwhile, a back cover (not shown) may be positioned at the rear of the PCB plate 150, and may be coupled to the PCB plate 150. For example, the back cover may cover the rear of the PCB plate 150, and the rear of a portion 133A of the material complexed panel 130 may not be covered by the back cover. As another example, the back cover may cover the rear of the PCB plate 150 and the rear of the material complexed panel 130.

Referring to FIGS. 24 to 26, a fastening groove H may be formed by the front skin 132 of the flat part 130P being recessed rearward. The rear skin 133 of the flat part 130P and the rear skin 133 of the fastening groove H may be parallel to each other. A thickness TO of the fastening groove H may be less than a thickness T1 of the flat part 130P.

A fastening hole 130S may be formed through a central portion of the fastening groove H in the front-and-rear direction. The fastening hole 130S may be formed by punching the front skin 132, the core 131 and the rear skin 133 of the fastening groove H.

A fastening member S may have a body SA that passes through the fastening hole 130S and protrudes to the rear of the rear skin 133 of the fastening groove H. A fastening portion 155 of the PCB plate 150 may be formed by being recessed forward from a rear surface of the horizontal portion 152 and/or the vertical portion 153, so as to allow the body SA of the fastening member S to be screw-coupled thereto. A head SH of the fastening member S may be engaged onto the fastening groove H.

Accordingly, the PCB plate 150 may be coupled to the material complexed panel 130 by the fastening member S.

In addition, the fastening member S may be a flat head screw. That is, the head SH of the fastening member S may have a flat shape, and a surface of the fastening groove H on which the head SH is seated or placed may be flat.

Thus, the head SH of the fastening member S and the fastening groove H may slip relative to each other. Due to the slip properties, it is possible to minimize damage caused by thermal deformation of the material complexed panel 130 and the plate 150 coupled to each other, which have different coefficients of thermal expansion.

Referring to FIGS. 1 to 26, a display device according to an aspect of the present disclosure may include: a display panel; a material complexed panel positioned behind the display panel, to which the display panel is coupled, and including fibers; and a side frame extending along a periphery of the material complexed panel, the side frame including: a horizontal part positioned between the display panel and the material complexed panel; and a vertical part intersecting the horizontal part and covering a side surface of the material complexed panel, the material complexed panel may include an outer part adjacent to the periphery of the material complexed panel and formed by being recessed rearward from a front surface of the material complexed panel, the horizontal part may faces the outer part and may be coupled to the outer part.

The display device may further include a hot-melt adhesive positioned between the horizontal part and the outer part, the horizontal part may be ultrasonic welded to the outer part through the hot-melt adhesive.

The horizontal part may include: an adhesive portion which is formed by being recessed forward from a rear surface of the horizontal part and which is opposite the outer part with respect to the hot-melt adhesive; and a first recessed portion formed by being recessed forward from the adhesive portion, the first recessed portion may be positioned at or adjacent to one end of the adhesive portion in a width direction of the horizontal part.

The horizontal part may further include a second recessed portion formed by being recessed forward from the adhesive portion, the second recessed portion may be positioned at or adjacent to the other end of the adhesive portion in the width direction of the horizontal part.

The horizontal part may press the outer part rearward while being ultrasonic welded to the outer part.

The material complexed panel may include a flat part surrounded by the outer part, the display device may further include: a first adhesive member positioned between the flat part and the display panel and coupled to the flat part and the display panel; and a second adhesive member positioned between the horizontal part and the display panel and coupled to the horizontal part and the display panel, a sum of a thickness of the flat part and a thickness of the first adhesive member may be substantially equal to a sum of a thickness of the outer part, a thickness of the hot-melt adhesive, a thickness of the horizontal part, and a thickness of the second adhesive member.

The material complexed panel may include a flat part surrounded by the outer part, and corners of the flat part may be rounded.

The side frame may further include: a first part extending along an upper side of the material complexed panel; a second part bent from the first part and extending along a left side of the material complexed panel; a third part bent from the second part and extending along a lower side of the material complexed panel; a fourth part aligned with the third part along the lower side of the material complexed panel; and a fifth part bent from the first part, extending along a right side of the material complexed panel, and from which the fourth part is bent, an end of the third part may be coupled to an end of the fourth part.

The material complexed panel may include: a front skin forming the front surface of the material complexed panel; a rear skin forming a rear surface of the material complexed panel; and a core positioned between the front skin and the rear skin, the core including the fibers.

The core may include a main fiber and a binder fiber.

The material complexed panel may further include: a first adhesive positioned between the front skin and the core and coupled to the front skin and the core; and a second adhesive positioned between the rear skin and the core and coupled to the rear skin and the core, each of the first adhesive and the second adhesive may be formed into a multilayers structure of fiber materials.

A rear end of the vertical part may protrude further rearward than a rear surface of the material complexed panel.

An edge of the rear surface of the material complexed panel may be rounded.

The display device may further include: a PCB plate opposite the display panel with respect to the material complexed panel; and a fastening member passing through the material complexed panel and coupled to the PCB plate, the material complexed panel may include a fastening groove formed by being recessed rearward from the front surface of the material complexed panel, and including a fastening hole through which the fastening member passes.

The fastening member may include: a body passing through the fastening hole and coupled to the PCB plate; and a head connected to the body and having a flat shape to be placed on the fastening groove, the fastening groove may be configured to slip relative to the head.

Certain embodiments or other embodiments of the disclosure described above are not mutually exclusive or distinct from each other. Any or all elements of the embodiments of the disclosure described above may be combined or combined with each other in configuration or function.

For example, a configuration "A" described in one embodiment of the disclosure and the drawings, and a configuration "B" described in another embodiment of the disclosure and the drawings may be combined with each other. Namely, although the combination between the configurations is not directly described, the combination is possible except in the case where it is described that the combination is impossible.

The above detailed description is to be construed in all aspects as illustrative and not restrictive. The scope of the present disclosure should be determined by reasonable interpretation of the appended claims, and all changes coming within the equivalency range of the present disclosure are intended to be embraced in the scope of the present disclosure.

The invention claimed is:

1. A display device comprising:
   a display panel;
   a material complexed panel positioned behind the display panel, to which the display panel is coupled, including fibers; and
   a side frame extending along a periphery of the material complexed panel, the side frame including:
      a horizontal part positioned between the display panel and the material complexed panel; and
      a vertical part intersecting the horizontal part and covering a side surface of the material complexed panel,
   wherein the material complexed panel comprises an outer part adjacent to the periphery of the material complexed panel and formed by being recessed rearward from a front surface of the material complexed panel, and
   wherein the horizontal part faces the outer part and is coupled to the outer part.

2. The display device of claim 1, further comprising a hot-melt adhesive positioned between the horizontal part and the outer part,
   wherein the horizontal part is ultrasonic welded to the outer part through the hot-melt adhesive.

3. The display device of claim 2, wherein the horizontal part comprises:
   an adhesive portion which is formed by being recessed forward from a rear surface of the horizontal part and which is opposite the outer part with respect to the hot-melt adhesive; and
   a first recessed portion formed by being recessed forward from the adhesive portion, and
   wherein the first recessed portion is positioned at or adjacent to one end of the adhesive portion in a width direction of the horizontal part.

4. The display device of claim 3, wherein the horizontal part further comprises a second recessed portion formed by being recessed forward from the adhesive portion, and
wherein the second recessed portion is positioned at or adjacent to the other end of the adhesive portion in the width direction of the horizontal part.

5. The display device of claim 2, wherein the horizontal part presses the outer part rearward while being ultrasonic welded to the outer part.

6. The display device of claim 5, wherein the material complexed panel comprises a flat part surrounded by the outer part,
wherein the display device further comprises:
a first adhesive member positioned between the flat part and the display panel and coupled to the flat part and the display panel; and
a second adhesive member positioned between the horizontal part and the display panel and coupled to the horizontal part and the display panel, and
wherein a sum of a thickness of the flat part and a thickness of the first adhesive member is substantially equal to a sum of a thickness of the outer part, a thickness of the hot-melt adhesive, a thickness of the horizontal part, and a thickness of the second adhesive member.

7. The display device of claim 5, wherein the material complexed panel comprises a flat part surrounded by the outer part, and
wherein corners of the flat part are rounded.

8. The display device of claim 1, wherein the side frame further comprises:
a first part extending along an upper side of the material complexed panel;
a second part bent from the first part and extending along a left side of the material complexed panel;
a third part bent from the second part and extending along a lower side of the material complexed panel;
a fourth part aligned with the third part along the lower side of the material complexed panel; and
a fifth part bent from the first part, extending along a right side of the material complexed panel, and from which the fourth part is bent, and
wherein an end of the third part is coupled to an end of the fourth part.

9. The display device of claim 1, wherein the material complexed panel comprises:
a front skin forming the front surface of the material complexed panel;
a rear skin forming a rear surface of the material complexed panel; and
a core positioned between the front skin and the rear skin and including the fibers.

10. The display device of claim 9, wherein the core comprises a main fiber and a binder fiber.

11. The display device of claim 9, wherein the material complexed panel further comprises:
a first adhesive positioned between the front skin and the core and coupled to the front skin and the core; and
a second adhesive positioned between the rear skin and the core and coupled to the rear skin and the core, and
wherein each of the first adhesive and the second adhesive is formed into a multilayers structure of fiber materials.

12. The display device of claim 1, wherein a rear end of the vertical part protrudes further rearward than a rear surface of the material complexed panel.

13. The display device of claim 12, wherein an edge of the rear surface of the material complexed panel is rounded.

14. The display device of claim 1, further comprising:
a PCB plate opposite the display panel with respect to the material complexed panel; and
a fastening member passing through the material complexed panel and coupled to the PCB plate,
wherein the material complexed panel comprises a fastening groove formed by being recessed rearward from the front surface of the material complexed panel, and including a fastening hole through which the fastening member passes.

15. The display device of claim 14, wherein the fastening member comprises:
a body passing through the fastening hole and coupled to the PCB plate; and
a head connected to the body and having a flat shape to be placed on the fastening groove, and
wherein the fastening groove is configured to slip relative to the head.

* * * * *